(12) United States Patent
Uhlhorn

(10) Patent No.: US 7,653,305 B1
(45) Date of Patent: Jan. 26, 2010

(54) OPTICAL TRANSPORT SYSTEM AND DEVICE

(75) Inventor: Brian L. Uhlhorn, St. Paul, MN (US)

(73) Assignee: Lockheed Martin Corporation, Bethesda, MD (US)

(*) Notice: Subject to any disclaimer, the term of this patent is extended or adjusted under 35 U.S.C. 154(b) by 582 days.

(21) Appl. No.: 11/257,620

(22) Filed: Oct. 25, 2005

(51) Int. Cl.
*H04B 10/24* (2006.01)
*H04J 14/00* (2006.01)

(52) U.S. Cl. .............................. 398/41; 398/67; 398/72

(58) Field of Classification Search .................. 398/41, 398/42, 66–68, 70–72
See application file for complete search history.

(56) References Cited

U.S. PATENT DOCUMENTS

| | | | |
|---|---|---|---|
| 4,590,619 A | 5/1986 | Winzer | |
| 4,630,254 A | 12/1986 | Tseng | |
| 4,712,859 A | 12/1987 | Albanese et al. | |
| 5,127,067 A | 6/1992 | Delcoco et al. | |
| 5,321,541 A | 6/1994 | Cohen | |
| 5,559,625 A * | 9/1996 | Smith et al. | 398/66 |
| 5,898,801 A | 4/1999 | Braun et al. | |
| 5,901,260 A | 5/1999 | Braun et al. | |
| 5,909,294 A | 6/1999 | Doerr et al. | |
| 6,650,804 B2 * | 11/2003 | Mills et al. | 385/17 |
| 6,694,102 B2 | 2/2004 | Baumann et al. | |
| 6,873,799 B2 | 3/2005 | Cohen et al. | |
| 2004/0146304 A1 | 7/2004 | Kuhara et al. | |

* cited by examiner

*Primary Examiner*—Nathan M Curs
(74) *Attorney, Agent, or Firm*—Larkin Hoffman Daly & Lindgren Ltd.; Craig J. Lervick

(57) ABSTRACT

The present disclosure is directed to an optical transport system and device that conserves power, provides for efficient transport of photonic signals and is capable to accommodate a number of different nodes. The system and device are implemented with the major components at the nodes to provide easy maintenance. In a first aspect, the disclosure is directed to an optical transport system that provides for low power and efficient transport of photonic signals. The optical transport system can be implemented with a plurality of similar or identical network interface units that correspond with each node of the system. Also disclosed is an optical transport system architecture having an example architecture that includes a primary system and a secondary system, which is redundant to the primary system and is adapted to be operational when the primary system is inactive, or an example architecture that includes just a primary system.

7 Claims, 18 Drawing Sheets

OPTICAL TRANSPORT SYSTEM AND DEVICE

BACKGROUND

The present disclosure relates to optical, or photonic, transport networks or systems and associated devices. An example of the present disclosure includes a fiber optic communication network and optical circuit components used in the network. More particularly, the present disclosure relates to optical transport system architectures and optical devices used in the optical transport system.

Fiber optical systems generally refer to the medium and technology associated with the transmission of signals in the form of light pulses, or photons, along a glass or plastic fiber. Optical systems are distinguishable from electrical systems using conventional electrically conductive wires, such as copper wire, in the transmission of electrical signals. Optical systems also include advantageous capabilities over electrical systems. For example, electrical signals interact with each other and their environment. This results in a need for non-intersecting and spaced-apart electrical wire links between electronic devices or electrical components. In contrast, photons generally do not interact with each other, and this leads to the possibility of different photonic signals sharing the same optical fiber.

Optical systems typically combine different photonic signals onto the same optical fiber, or separate photonic signals carried on the same optical fiber, with a generally similar basic circuit structure. Several optical transmitters can be used to each generate a particular optical signal. The optical signals from the transmitters are input to an optical multiplexer. The optical multiplexer is a photonic circuit component that combines several photonic signals into a single photonic transmission that can be carried on the single optical fiber. In order to separate the single photonic transmission on the single optical fiber, systems can use an optical de-multiplexer. The optical de-multiplexer is a photonic circuit component that separates a single photonic transmission into the individual photonic signals. The outputs of the optical de-multiplexer are coupled to optical receivers. Each of the individual photonic signals is carried on to the corresponding optical receiver.

In general, the multiplexer or de-multiplexer in the basic optical structure performs a type of wavelength division multiplexing, or WDM. Wavelength division multiplexing is used to carry many different types of data on the same optical fiber. Wavelength division multiplexing is a fiber optic technique that employs light wavelengths to transmit photonic signals in parallel on the same optical fiber. Wavelength division multiplexing has enabled optical service providers to meet consumer demands for ever-increasing bandwidth. Wavelength division multiplexing uses several to many channels (also known as lambdas or colors) to provide high capacity bandwidth across the optical system or optical network. Each channel carries an individual photonic signal providing the same bandwidth per channel in a single photonic stream. The channels are de-multiplexed at the end location. Several devices can be used to provide the multiplexing or de-multiplexing functions.

Often, systems using wavelength division multiplexing employ one of two general network topologies to manage the bidirectional transmission of data over a network. (Bidirectional data transmission occurs when signals are transmitted along both directions of an optical transmission path such as optical fiber.) These two topologies are a star and a ring. The star topology is where all of the data is transmitted to a central location of the network and then retransmitted to the intended recipient. An example can be imagined by considering a company mail room. Letters to be sent are first collected and brought to the mail room, and from there the letters are taken to the intended addressees. A ring topology is where all of the transmitters and recipients are linked together in a closed loop. An example can be imagined by considering the numbers on the face of an analog clock. If 1 wants to send a signal to 6, 1 must send the signal clockwise through 2-5 (or counterclockwise through 12-7). A third type of topology, a linear bus, is popular with many types of electronic systems, such as a personal computer, but is difficult to implement in optical systems.

Despite the popularity of the star and ring topologies, they are not without their disadvantages. In a star coupled network, all of the nodes are connected to a central location using optical transmission paths, and the central location broadcasts data from each transmitting node to generally all of the nodes on the network. In a passive star network, data is broadcast by splitting the optical signal. This results in a practical limitation of about sixteen nodes due to the reduction of power in the splitting process. An active star coupler regenerates the optical signal within the star and can be used for larger networks, but this requires significantly more controls, expense, and maintenance issues. Also, active stars typically employ the technologies and controls used in constructing a difficult-to-implement linear bus topology. A ring coupled network is more easily implemented and more scalable than the star network. Ring networks, however, are more dependent on each of the nodes. If one node fails, the entire communication network could be disrupted. In addition, the entire communication network could be disrupted if power fails, and the ring typically requires relatively large amounts of power to operate.

Accordingly, there is a continuing need for improved network topologies and devices used to support the network that conserve power, are scalable to accommodate a broad number of nodes, are easily maintained, and are readily implemented on optical systems where failure of a node or component does not disrupt a large portion of the network.

SUMMARY

The present disclosure is directed to an optical transport system and device that conserves power, provides for efficient transport of photonic signals and is scalable to accommodate a number of different nodes. In certain aspects, the optical transport system and device are readily implemented with the major optical components at the nodes to provide for easy maintenance. In another aspect, the nodes include components for a redundant system to further reduce maintenance and improve system reliability.

In a first aspect, the present disclosure is directed to an optical transport system that provides for a low power and an efficient transport of photonic signals throughout the transport system as compared to previous network topologies. In addition, the optical transport system of this aspect can be implemented with a plurality of similar or identical network interface unit that correspond with each node of the system.

The photonic transport system of the first aspect includes bidirectional coupler/splitter devices each including a pair of lower level optical ports and a higher level optical port. One of the devices is a center device and the remaining devices are grouper devices. Photonic signals entering the higher level port of each device are split and provided to the lower level ports, and photonic signals entering the lower level ports are adapted to be coupled together and provided to the higher level port.

The coupler/splitter devices are arranged in levels including an ultimate level, a penultimate level, and at least one additional level. The ultimate level includes the center device, and the penultimate level and the at least one level includes the grouper devices. The higher level port of the center device is coupled to itself. Each of the lower level ports of the center device is bidirectionally coupled to a higher level port of a unique grouper device in the penultimate level. Each of the lower level ports of the grouper devices in the at least one additional level are coupled to one of the optoelectronic devices or to other unique grouper devices.

In a second aspect, the present disclosure is directed to a network interface unit that contains components for constructing a version of the optical transport system. In one example the network interface unit is contained within a single package. The system can be repaired by swapping a network interface unit with new network interface unit.

The network interface unit of the second example includes six bidirectional optical terminals mechanically coupled together. The network interface unit also includes four optical coupler/splitter devices, each including lower level ports and a higher level port. The first and second terminals are each optically coupled to lower level ports of the first optical coupler/splitter device. The third and a fourth terminals of the plurality of the optical terminals are each optically coupled to lower level ports of the second optical coupler/splitter device. The higher level ports of the first and second coupler/splitter devices are each optically coupled to lower level ports of the third coupler/splitter device. The higher level port of the third coupler/splitter device is optically coupled to the fifth terminal. The network interface unit also includes an optical transmitter device and an optical receiver device each optically coupled to lower level ports of the fourth coupler/splitter device. The higher level port of the fourth coupler/splitter device is optically coupled to the sixth terminal.

In a third aspect, the present disclosure is directed to an optical transport system architecture. The architecture of the third aspect includes two or more node sections, and each node section includes a plurality of network interface unit devices such that each network interface unit device corresponds with a node. One of the nodes is a central node. Each node section includes one primary grouper node and additional grouper nodes. The architecture also includes first and second bidirectional optical transmission paths coupled to the central node. Each of the first bidirectional optical transmission paths is also coupled to a separate one of the primary grouper nodes. Each of photonic signals from the primary grouper nodes is provided to the central node, and then all of the signals received from the central node are provided to all of the primary grouper nodes. The second bidirectional optical transmission paths are coupled to each of the primary grouper nodes. Each of the second paths is also coupled to a separate one of the additional grouper nodes in the corresponding node section. Each photonic signal from the additional grouper nodes is provided to the connected primary grouper nodes and then provided to the central node.

In a fourth aspect, the present disclosure is directed to an optical transport system architecture including a primary system and a secondary system, which is redundant to the primary system and is adapted to be operational when the primary system is inactive.

The architecture of the fourth aspect includes two or more node sections where each node section includes a plurality of network interface unit devices. Each network interface unit device corresponds with a node. The architecture includes a primary optical transport system and a secondary optical transport system configured from the nodes.

In the primary system, one of the nodes is a primary central node. Also, each node section includes one primary grouper node. Further, each node section includes a plurality of primary additional nodes.

The nodes of the primary system are coupled together with a plurality of first and second bidirectional optical transmission paths. The plurality of first bidirectional optical transmission paths are coupled to the primary central none, and each of the plurality of first bidirectional optical transmission paths is also coupled to a separate one of the primary grouper nodes. Each photonic signal from the primary grouper nodes is provided to the primary central node, and then the signals are provided back to all of the primary grouper nodes. The plurality of second bidirectional optical transmission paths are coupled to each of the primary grouper nodes. In each node section, each of the plurality of second bidirectional optical transmission paths is also coupled to a separate one of the primary additional nodes in the node section. Each photonic signal from the additional nodes is provided to the primary grouper node and then is provided to the primary central node.

The secondary optical transport system is adapted to operate when the primary transport system is inactive. The secondary optical transport system includes a secondary central node where one of the primary additional nodes is also the secondary central node. The secondary system also includes a plurality of secondary grouper nodes where each node section includes one secondary grouper node. One of the primary additional nodes that is not the secondary central node is also the secondary grouper node. Further, the secondary system includes secondary additional nodes in each node section. The nodes in the primary optical system that are not also the secondary central node and the secondary grouper nodes are secondary additional nodes.

The nodes of the secondary system are coupled together with a plurality of third and fourth bidirectional optical transmission paths. The third bidirectional optical transmission paths are coupled to the secondary central none, and each of the third bidirectional optical transmission paths is also coupled to a separate one of the secondary grouper nodes. Each of photonic signals from the secondary grouper nodes is provided to the secondary central node and then all of the signals are provided to all of the secondary grouper nodes. The fourth bidirectional optical transmission paths are coupled to each of the secondary grouper nodes. In each node section, each of the plurality of fourth bidirectional optical transmission paths is also coupled to a separate one of the secondary additional nodes in the node section. Each photonic signal from the additional nodes in a section is provided to the secondary grouper node and then is provided to all of the secondary central nodes.

The fifth aspect includes an optical network interface unit, similar to the network interface unit of the second aspect but specifically adapted to include a redundancy feature and is suitable for use in the architecture of the fourth aspect. The network interface unit of the fifth aspect includes eight bidirectional optical terminals mechanically coupled together, five optical coupler/splitter devices, each optical coupler/splitter device including a plurality of lower level ports and a higher level port, and one of each of an optical transmitter and an optical receiver. The first and second terminals are each optically coupled to lower level ports of the first optical coupler/splitter device, and the third and a fourth terminals are each optically coupled to lower level ports of the second optical coupler/splitter device. The higher level ports of the first and second coupler/splitter devices are each optically coupled to lower level ports of the third coupler/splitter device, and the higher level port of the third coupler/splitter device is optically coupled to the fifth terminal. The optical transmitter and the optical receiver are each optically coupled to lower level ports of the fourth coupler/splitter device. The higher level port of the fourth coupler/splitter device is optically coupled to the sixth terminal, and the higher level port of the fourth coupler/splitter device is optically coupled to one of the lower level ports of the fifth coupler/splitter device. Another of the lower level ports of the fifth coupler/splitter device is optically coupled to the seventh terminal, and the higher level port of the fifth coupler/splitter device is optically coupled to the eighth terminal.

DETAILED DESCRIPTION

This disclosure relates to optical transport systems and optical devices. The disclosure, including the figures, describes the systems and devices with reference to a several illustrative examples. For instance, the disclosure proceeds with an example of a thirty-two node network and with a device corresponding with each node described below. However, it should be noted that the present invention could be implemented in other systems and devices, as well. The present invention is described with respect to the particular examples for illustrative purposes only. Other examples are contemplated and are mentioned below or are otherwise imaginable to someone skilled in the art. The scope of the invention is not limited to the few examples, i.e., the described embodiments of the invention. Rather, the scope of the invention is defined by reference to the appended claims. Changes can be made to the examples, including alternative designs not disclosed, and still be within the scope of the claims.

Figure 1A:
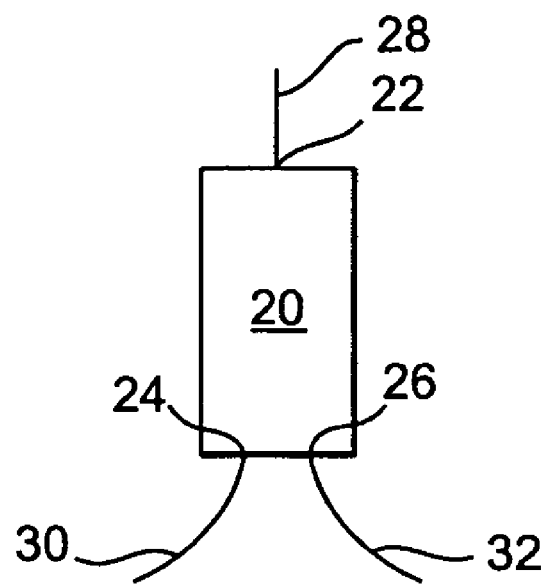
FIG. 1A is a schematic diagram of an example coupler/splitter device adapted for use in the optical transport systems and optical units of the present disclosure.

FIG. 1A is a schematic diagram of an optical coupler/splitter device 20 used in many of the examples of this disclosure, and it is presented here to establish a basic description and terminology used throughout the disclosure. The optical coupler/splitter device 20 distributes optical signals or power from one port to two or more ports, or it concentrates optical signals or power from two or more ports to a single port. The coupler/splitter device 20 is bidirectional in that each of the ports are adapted to both input and output either simultaneous or separate optical signals. The bidirectional coupler/splitter device 20 can distribute optical signals or power among two or more ports and it can concentrate optical signals or power from two or more ports to a single port. Optical coupler/splitter devices are well known in the art. They include simple and relatively inexpensive fused-type devices, more complicated multiplexer/demultiplexer devices, and other devices. The optical coupler/splitter devices suitable for use in this disclosure can include a variety of split ratios, such as in the range from 50/50 to 1/99 or lower. In one particular example of the present disclosure, the split ratio of the coupler/splitter devices is 50/50, or approximately 50/50.

In the example, the device 20 is shown including "higher level" port 22 and a pair of "lower level" ports 24, 26. The higher level port 22 receives a signal to be distributed to each of the lower level ports 24, 26. The higher level port 22 acts as the input and the lower level ports 24, 26 act as the output to an optical splitter. In addition, the signals presented as inputs to the lower level ports 24, 26 are concentrated to the higher level port 22. The lower level ports 24, 26 act as the input and the higher level port 22 acts as the output to an optical coupler. The optical ports are adapted to be coupled to optical transmission paths, such as fiber optical lines. The example shows fiber optical line 28 coupled to the higher level port 22, and fiber optical lines 30, 32 coupled to the lower level ports 24, 26, respectively.

Figure 1B:
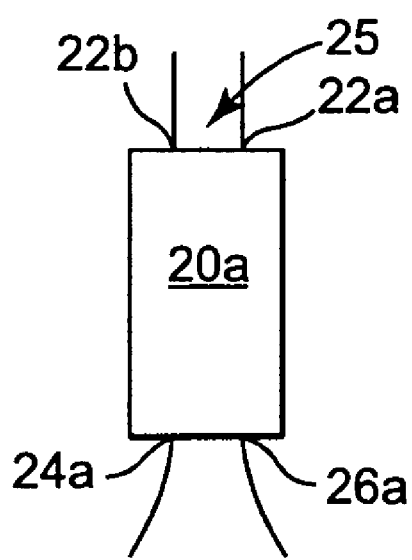
FIG. 1B is a schematic diagram of another example coupler/splitter device.

It is to be understood that the device can include more than one higher level port or more than two lower level ports. FIG. 1B shows one simple alternative optical coupler/splitter 20a having four ports, including two higher level ports 22a, 22b and two lower level ports 24a, 24b. A signal presented as an input to either higher level optical ports 22a or 22b will be split or distributed to both lower level ports 24a and 26a. Also, a signal presented as an input to either lower level optical ports 24a or 26a will be split or distributed to both higher level ports 22a and 22b. From another perspective, the higher level ports 22a, 22b can be considered to be a single higher level port 25 with two sub-ports 22a, 22b. In one example of the higher level port "connected to itself," the one sub-port 22a is connected to an optical transmission path to the other sub-port 22b. Other alternatives are possible. In addition, the coupler/splitter devices 20, 20a can each be a single device or formed from multiple sub-devices working together.

Figure 2:
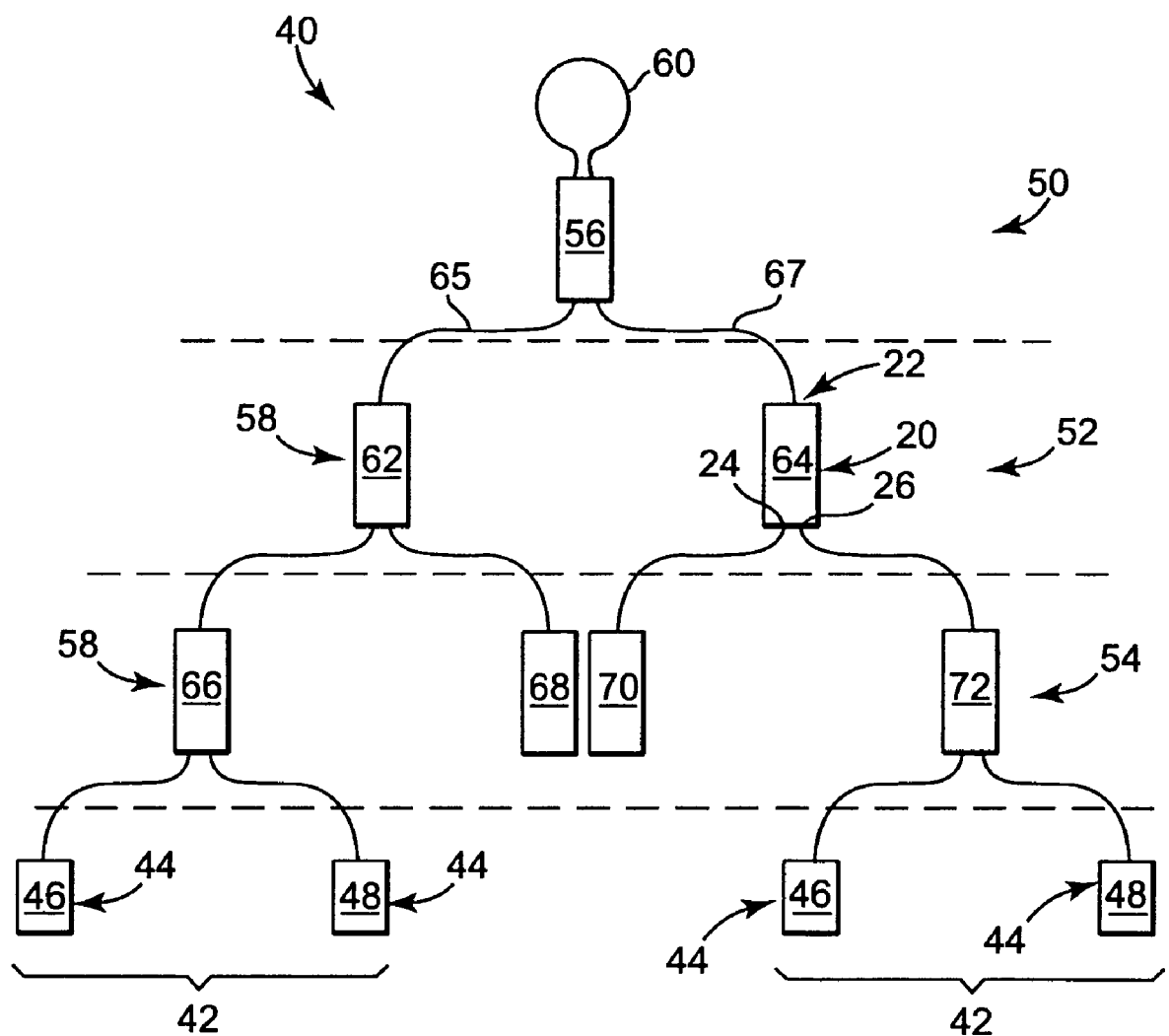
FIG. 2 is a schematic diagram of an example optical transport system of the present disclosure.

FIG. 2 shows a schematic diagram of an example of an optical transport system 40 of the present disclosure that is constructed from a set of bidirectional coupler/splitter devices such as that indicated above at 20. Each of the bidirectional coupler/splitter devices 20 in the set includes a higher level optical port 22 and a pair of lower level optical ports 24. The photonic transport system 40 is adapted to bidirectionally transport photonic signals between a plurality of nodes 42 that include optoelectronic devices 44, which can include either optical transmitters 46 or optical receivers 48. For example, an optical signal generated with one of the optical transmitters 46 is transported within the system to be received by all of the optical receivers 48 connected to the system.

The set of devices 20 are arranged in a plurality of levels including an ultimate level 50, a penultimate level 52, and at least one additional level 54. The bidirectional coupler/splitter device in the ultimate level 50 is called a center device 56. The bidirectional coupler/splitter devices in the penultimate level 52 and the additional levels, for instance level 54, are called grouper devices such as at 58, which bring a number of lower level branches into a higher level branch. The higher level port of the center device 56 is coupled to itself with an optical transmission path 60. The lower level ports of the center device 56 are each bidirectionally coupled to a higher level port of two unique grouper devices 62, 64 in the penultimate level 52 with bidirectional optical transmission paths 65, 66 respectively. The higher level port of a "unique device" is connected to only one other device. The lower level ports of the grouper devices 62, 64 in the penultimate level 52 are each bidirectionally coupled to a higher level port of unique grouper devices 66, 68, 70, 72 in the at least one additional level 54 with bidirectional optical paths, as shown. The lower level ports of the grouper devices 66, 68, 70, 72 in the at least one additional level 54 are each coupled to either a corresponding optoelectronic device 44 or to other unique grouper devices in still a further additional level of grouper devices (not shown in FIG. 2). One skilled in the art can now imagine how the system can be extended to include multiple-further additional levels if desired.

In operation, the transport system 40 receives photonic signals provided by the transmitters 46 coupled to the system and provides each of the transmitted signals to each of the receivers 48 coupled to the system. For example, the optical transmitter 46 coupled to the system, provides a photonic signal along the optical transmission path to grouper device 66. The signal is then provided to grouper device 62 and on to the center device 56. The optical signal is provided on transmission path 60 and back to the center device 56 where it is split and provided to grouper devices 62, 64. From grouper device 62, the optical signal is provided to grouper devices 66, 68. From grouper device 64, the optical signal is also provided to grouper devices 70, 72. The optical signal is provided to the lower level ports of grouper devices 66, 68, 70, 72 and consequently on to at least optical receivers 48 coupled to grouper devices 66 and 72.

The optoelectronic devices 44 convert electrical signals into optical signals in the case of the optical transmitters 46, or optical signals into electrical signals in the case of the optical receivers 48. The optoelectronic devices 44 interface with an electronic system used to process signals. The optical transmitters 46 can include one or more photonic generators or photonic generator arrays and can include additional components such as multiplexers and other known or unknown components associated with optical signal generation for fiber optical systems. Similarly, the optical receivers 48 can include one or more photonic detectors or photonic detector arrays and typically include demultiplexers and other components associated with optical signal detection. In another example, an optical transmitter and an optical receiver can be combined into a single transceiver device where the lower ports of the corresponding connected coupler/splitter device are connected to the optical input and optical output ports of the transceiver.

The transmitter includes a photonic radiation generator or a photonic generator array having a plurality of photonic radiation generators. The photonic radiation generators each include a photonic generator output, which provides a photonic signal. The photonic generator or array includes a photonic generator input that is adapted to receive a generator input signal from one or more data sources. The photonic radiation generators provide the photonic signals in response to the generator input signal. An optical multiplexer is a photonic circuit component that combines several photonic signals into a single photonic transmission that can be carried on a single transmission path or optical fiber. The multiplexer can be used in connection with a photonic generator array to combine the plurality of photonic signals onto a single optical transmission path.

The receiver includes a photonic detector or a photonic detector array having a plurality of photonic detectors. The photonic detectors each receive selected optical signals. The photonic detectors generate signal outputs in response to the received selected optical signals, and a detector output signal from the detectors can be provided to one or more data receivers. An optical demultiplexer is a photonic circuit component that separates a single photonic transmission into the individual photonic signals. The outputs of the optical demultiplexer are coupled to the optical detectors. Each of the individual photonic signals is carried to the corresponding optical detector.

The multiplexer or demultiplexer performs a type of wavelength division multiplexing, or WDM. Wavelength division multiplexing is a fiber optic technique that employs light wavelengths to transmit photonic signals in parallel on the same optical fiber. Wavelength division multiplexing is used to carry different types of data on the same optical transmission path. Wavelength division multiplexing uses several to many channels to provide high capacity bandwidth across the optical system or optical network. The channels are demultiplexed at the end location.

The optical transmission paths, such as paths 60, 65, 67 and other indicated paths not labeled, between the devices (such as coupler splitter/devices 20, optoelectronic devices 44, and the like) are a schematic representation of the optical interconnection between such devices. The transmission paths can include optical fibers, other optical components (such as amplifiers, isolators, or others), a combination of optical fibers and other optical components in a path between the devices, or the devices can be directly optically coupled together (such as in the case of two or more devices being integrally formed together, or the like). Many of the optical transmission paths are bidirectional and able to carry signals in either direction between the devices, but not all transmission paths need necessarily be bidirectional.

One possible example of a non-bidirectional transmission path can be the transmission path 60 where the higher level port of the center device 56 is coupled to itself. In one example, the transmission path 60 is unidirectional and can include an optical isolator, unidirectional optical amplifier or optical diode, or other component interposed in the transmission path to reduce or prevent signals from traveling bidirectionally along the path 60. In one example, the center device 56 includes a four-port coupler/splitter 20a with two higher-level sub-ports 22a, 22b connected to each other with path 60.

Figure 3:
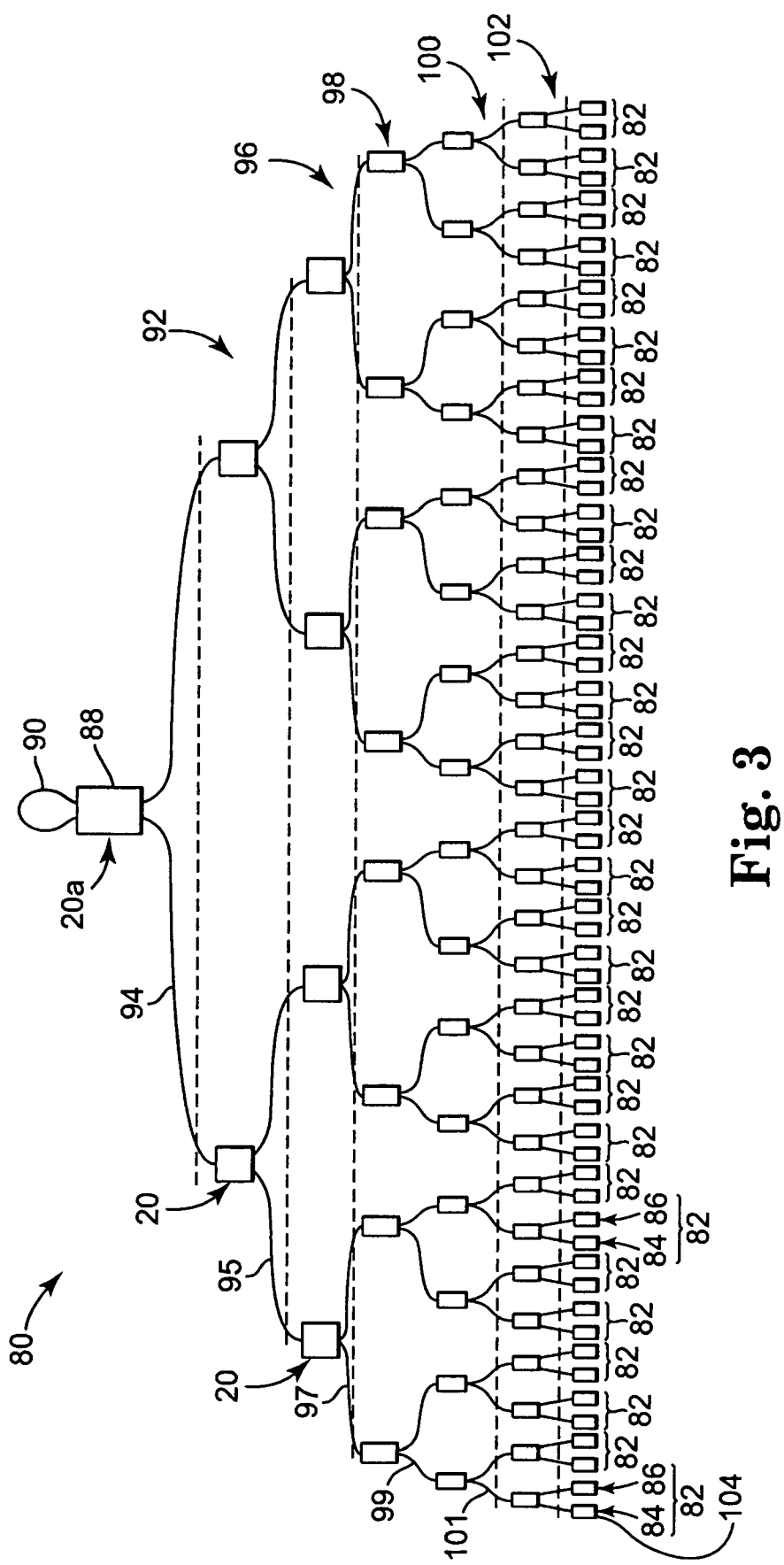
FIG. 3 is a schematic diagram of another example optical transport system of the present disclosure.

FIG. 3 shows a schematic diagram of another example of an optical transport system 80 of the present disclosure also constructed from a set of bidirectional coupler/splitter devices such as that indicated above at 20. In this example, the device includes thirty-two nodes 82, where each of the nodes 82 includes an optical transmitter 84 and an optical receiver 86. The set includes sixty-three bidirectional coupler/splitter devices 20 where one of the coupler/splitter devices is a center device 88 and the remaining coupler/splitter devices are grouper devices. The center device 88 includes a higher level port coupled to itself with a unidirectional optical path 90, and can be constructed as the coupler/splitter 22a indicated above. The two lower level ports of the center device 88 are each coupled to a higher level port of unique coupler/splitter devices in a lower level 92 with bidirectional optical transmission paths 94. The two lower level ports of each of the coupler/splitter devices in the level 92 are coupled to the higher level port of unique coupler/splitter devices in lower level 96 with bidirectional optical transmission paths, such as path 95. The lower level 96 includes four coupler/splitter devices. The two lower level ports of each of the coupler/splitter devices in the level 96 are coupled to the higher level port of unique coupler/splitter devices in lower level 98 with bidirectional optical transmission paths, such as path 97. The lower level 98 includes eight coupler/splitter devices. The two lower level ports of each of the coupler/splitter devices in the level 98 are coupled to the higher level port of unique coupler/splitter devices in lower level 100 with bidirectional optical transmission paths, such as path 99. The lower level 100 includes sixteen coupler/splitter devices. The two lower level ports of each of the coupler/splitter devices in the level 100 are coupled to the higher level port of unique coupler/splitter devices in lower level 102 with bidirectional optical transmission paths, such as path 101. The lower level 102 includes thirty-two coupler/splitter devices. One of the lower level ports of each coupler/splitter device in level 102 is coupled to one optical transmitter, and the other of the lower level ports of each coupler/splitter device in level 102 is coupled to one optical receiver 86.

In an example of operation, an optical transmitter 84, such as specific transmitter 104, provides a signal to the transport system initially to coupler/splitter coupled to the transmitter in level 102 at a lower level port. The coupler/splitter in level 102 provides the signal at its higher level port to the coupler/splitter coupled to it in level 100. The coupler/splitter in level 100 provides the signal at its higher level port to the coupler/splitter coupled to it in level 98. The coupler/splitter in level 98 provides the signal at its higher level port to the coupler/splitter coupled to it in level 96. The coupler/splitter in level 96 provides the signal at its higher level port to the coupler/splitter coupled to it in level 92. The signal is then provided to the center device 88 that provides the signal to itself along transmission path 90. The signal is then provided from the lower level ports of the center device to the higher level ports of all of the devices in level 92. The signal is then provided from the lower level ports of the devices in level 92 to the higher level ports of all of the devices in level 96. The signal is then provided from the lower level ports of the devices in level 96 to the higher level ports of all of the devices in level 98. The signal is then provided from the lower level ports of the devices in level 98 to the higher level ports of all of the devices in level 100. The signal is then provided from the lower level ports of the devices in level 100 to the higher level ports of all of the devices in level 102. The signal is then provided from the lower level ports of the devices in level 102 to all of the optical receivers 86 coupled to the optical transport system 80.

Figure 4:
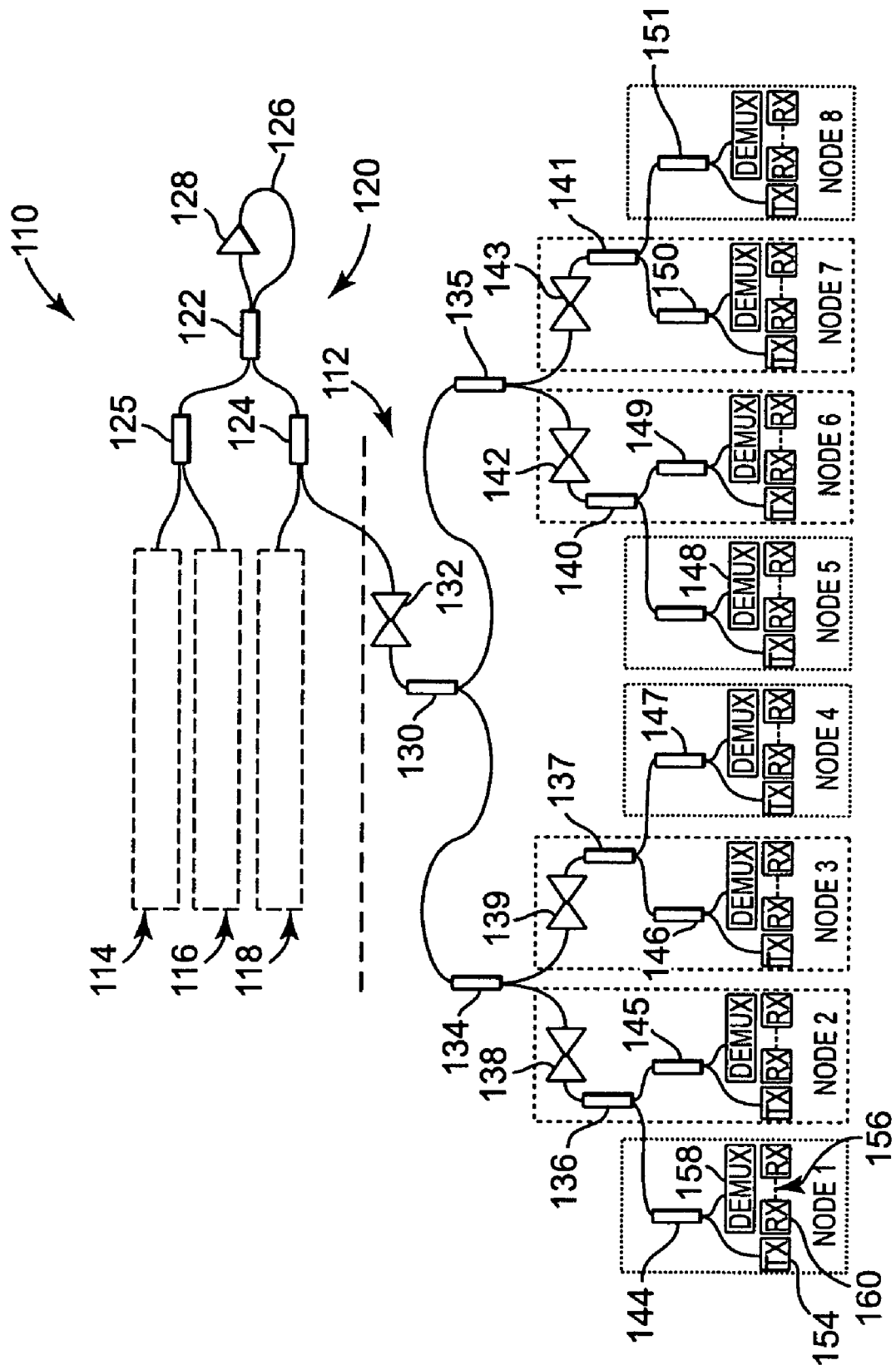
FIG. 4 is a schematic diagram of an exemplary embodiment of the optical transport system of the present disclosure.

FIG. 4 is a schematic diagram of an exemplary embodiment of an optical transport system 110 of the present disclosure. For the sake of clarity of illustration, the system 110 has been separated into a center portion 120 connected to four sections 112, 114, 116, 118 where each section contains eight nodes. Only section 112 is shown in detail. The remaining sections 114, 116, 118 follow the same design as in section 112. The center portion includes a center device coupler/splitter 122 having two lower level ports each bidirectionally coupled to one of the higher level ports of coupler/splitters 124, 125 as shown. The higher level port of the center device 122 is coupled to itself with an optical transmission path 126 including a device to providing unidirectional optical transmission such as unidirectional amplifier or optical isolator 128.

The lower level ports of coupler/splitter devices 124, 125 are each bidirectionally coupled to a unique section 112, 114, 116, or 118, as shown. The lower level port of the coupler/splitter device 124 connected to section 112 is connected to coupler/splitter device 130 via bidirectional amplifier 132. The lower level ports of device 130 are bidirectionally coupled to the higher level port of device 134 and 135. The lower level ports of device 134 are coupled to the higher level port of coupler/splitter devices 136, 137 via bidirectional amplifiers 138, 139 respectively. The lower level ports of device 135 are coupled to the higher level port of coupler/splitter devices 140, 141 via bidirectional amplifiers 142, 143 respectively. As can be seen, the optical amplifiers are disposed in the optical transmission paths between every other level in this example. The higher level ports of coupler/splitter devices 144, 145 are coupled to the lower level ports of device 136; the higher level ports of coupler splitter devices 146, 147 are coupled to the lower level ports of device 137; the higher level ports of coupler/splitter devices 148, 149 are coupled to the lower level ports of device 140; and the higher level ports of coupler/splitter devices 150, 151 are coupled to the lower level ports of device 141, as shown.

One of lower level ports of each of devices 144-151 is coupled to a unique optical transmitter 154, and the other of the lower level ports of each of devices 144-151 is coupled to a unique optical receiver system 156. In the example shown, each of the optical receiver systems 156 includes a demultiplexer 158 coupled to an array of receivers 160.

Figure 5:
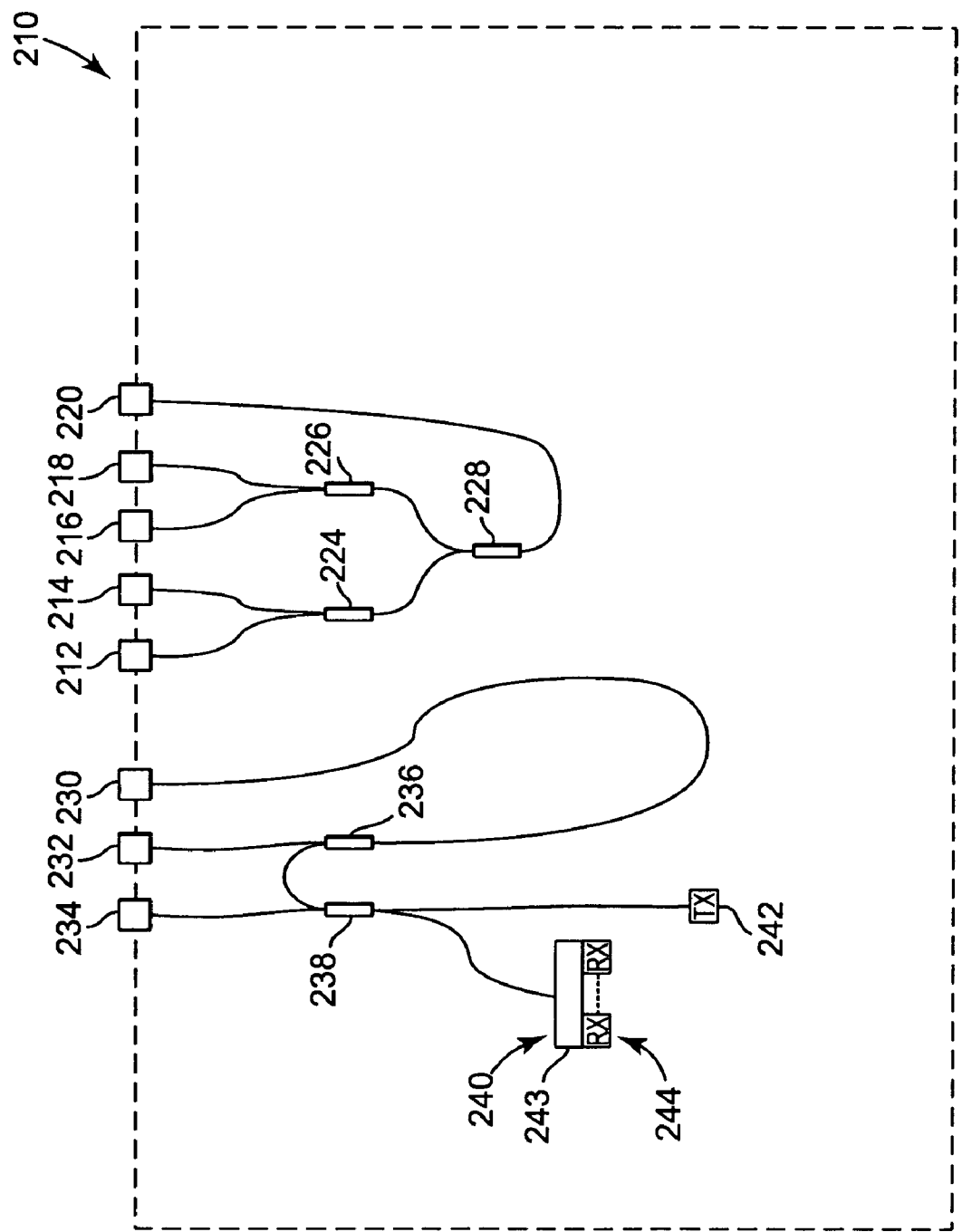
FIG. 5 is a schematic diagram an example network interface unit, or NIU device, that is adapted to construct the optical transport systems of the present disclosure including the optical transport systems shown in FIGS. 2, 3, and 4.

FIG. 5 is a schematic diagram an example network interface unit 210, or NIU device. A plurality of interconnected NIU devices 210 are adapted to construct the optical transport systems of the present disclosure including the optical transport systems shown in FIGS. 2, 3, and 4.

The NIU device 210 includes five optical terminals 212, 214, 216, 218, 220 that can be adapted to be coupled to at least one other NIU devices in the optical transport system via optical transmission paths such as optical fibers. Terminals 212 and 214 are coupled to the lower level ports of coupler/splitter device 222, and terminals 216 and 218 are coupled to the lower level ports of coupler/splitter device 224, as shown. The higher level ports of coupler/splitter devices 222, 224 are connected to the lower level ports of coupler/splitter device 228. The higher level port of coupler/splitter device 228 is coupled to terminal 220.

The NIU device 210 includes three additional terminals 230, 232, 234 that are adapted to be coupled to at least one, but preferably several other NIU devices in the optical transport system via optical transmission paths. Terminal 230 is coupled to the higher level port of coupler/splitter device 236.

One of the lower level ports of coupler/splitter device 236 is coupled to terminal 232. The other of the lower level ports of coupler/splitter device 236 is coupled to one of two higher level ports of coupler/splitter device 238. The other of the higher level ports of coupler/splitter device 238 is coupled to terminal 234. One of the lower level ports of coupler/splitter device 238 is coupled to an optical receiver assembly 240, and the other of the lower level ports is coupled to an optical transmitter device 242. The optical receiver assembly 240 in the example includes a wavelength division demultiplexer 243 coupled between the coupler/splitter device 238 and an array of photonic detectors 244. The optical transmitter device 242 in the example includes a tunable photonic generator. Other examples of receivers and transmitters are contemplated.

The eight terminals of the NIU device 210 are mechanically coupled together in the example. For instance, the five terminals 212, 214, 216, 218, 220 are mechanically linked with the three additional terminals in order to form a single NIU device. In one example, the eight terminals are mechanically coupled to a single case that houses the components of the NIU device. The components can be coupled together with optical fiber. In another example, the components of the NIU device are integrally formed together during fabrication and do not contain optical/mechanical couplings between the components such as optical fiber.

The optical transmission paths within the NIU device 210 can include some or all of the additional optical components for supporting the overall optical transport system. In an example where an NIU device does not include any additional components interposed in the transmission paths, the additional components can be included in the optical interconnections between NIU devices if needed. One preferred example, however, includes all of the optical components, such as the amplifiers and isolator, for a short distance optical transport system to be included in the NIU devices themselves such as the optical transport system 110 shown in FIG. 4. This NIU device can also work for longer distances, and the optical interconnections between the NIU devices include additional components such as repeaters and other components for long distance optical transmission.

Figure 6:
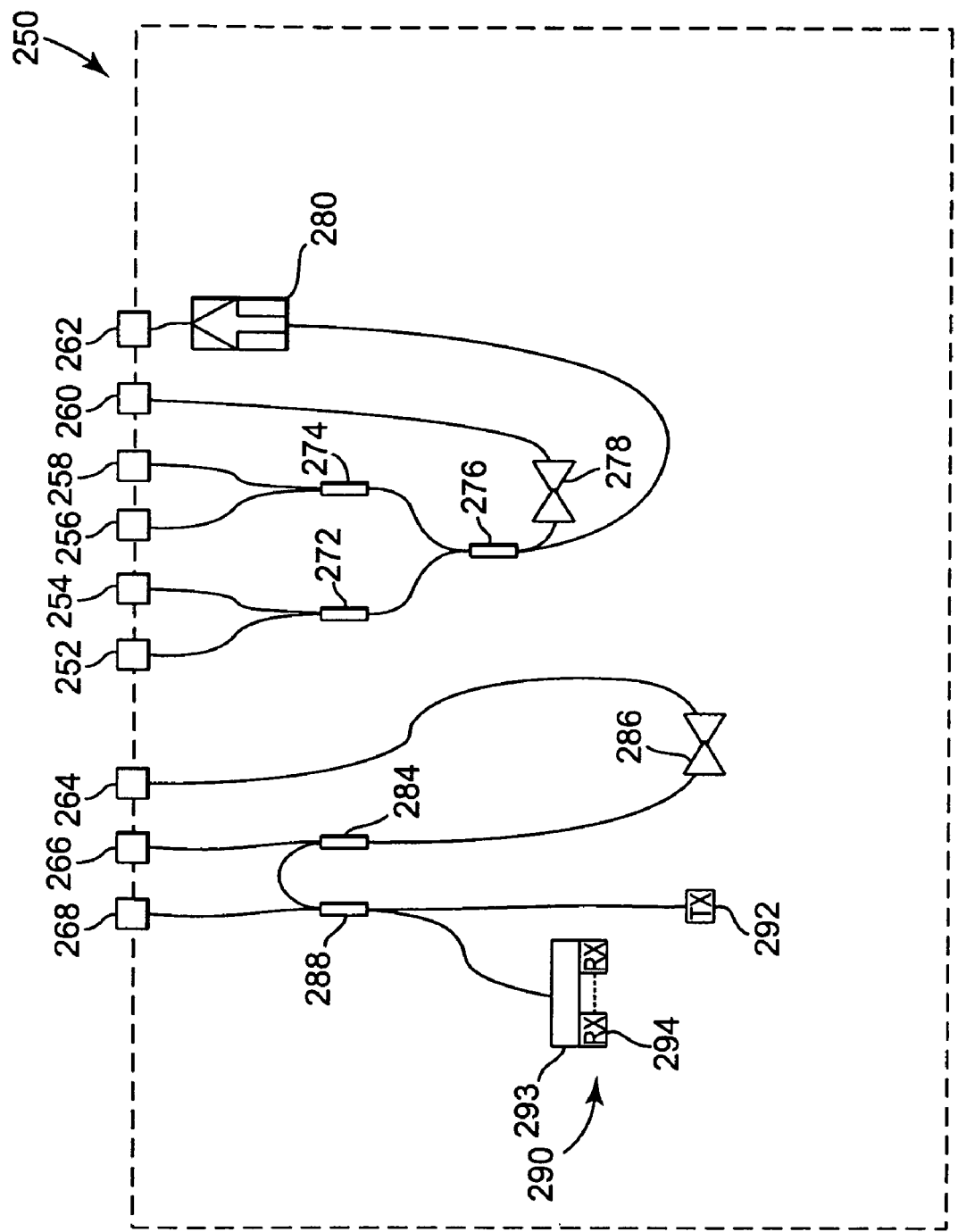
FIG. 6 is a schematic diagram of another example of a network interface unit that is adapted to construct the optical transport systems of the present disclosure including the optical transport system shown in FIG. 4.

FIG. 6 is a schematic diagram of another example of a network interface unit, or NIU device 250 that is adapted to construct the optical transport systems of the present disclosure including the optical transport system shown in FIG. 4. The NIU device 250 includes nine terminals, 252, 254, 256, 258, 260, 262, 264, 266, 268. Terminals 252 and 254 are coupled to the lower level ports of coupler/splitter device 272, and terminals 256 and 258 are coupled to the lower level ports of coupler/splitter device 274, as shown. The higher level ports of coupler/splitter devices 272, 274 are connected to the lower level ports of coupler/splitter device 276, which includes two higher level ports. One of the higher level ports of coupler/splitter device 276 is coupled to terminal 260 through a bidirectional amplifier 278. The other of the higher level ports of coupler/splitter device 276 is coupled to terminal 262 through an unidirectional amplifier or optical isolator 280.

The NIU device includes three additional terminals 264, 266, 268 that are adapted to be coupled to at least one, but preferably several other NIU devices in the optical transport system via optical transmission paths. Terminal 264 is coupled to the higher level port of coupler/splitter device 284 through a bidirectional amplifier 286. One of the lower level ports of coupler/splitter device 284 is coupled to terminal 266. The other of the lower level ports of coupler/splitter device 284 is coupled to one of two higher level ports of coupler/splitter device 288. The other of the higher level ports of coupler/splitter device 288 is coupled to terminal 268. One of the lower level ports of coupler/splitter device 288 is coupled to an optical receiver assembly 290, and the other of the lower level ports is coupled to an optical transmitter device 292. The optical receiver assembly 290 in the example includes a wavelength division demultiplexer 293 coupled between the coupler/splitter device 288 and an array of photonic detectors 294. The optical transmitter device 292 in the example includes a tunable photonic generator. Other examples of receivers and transmitters are contemplated.

Figure 7:
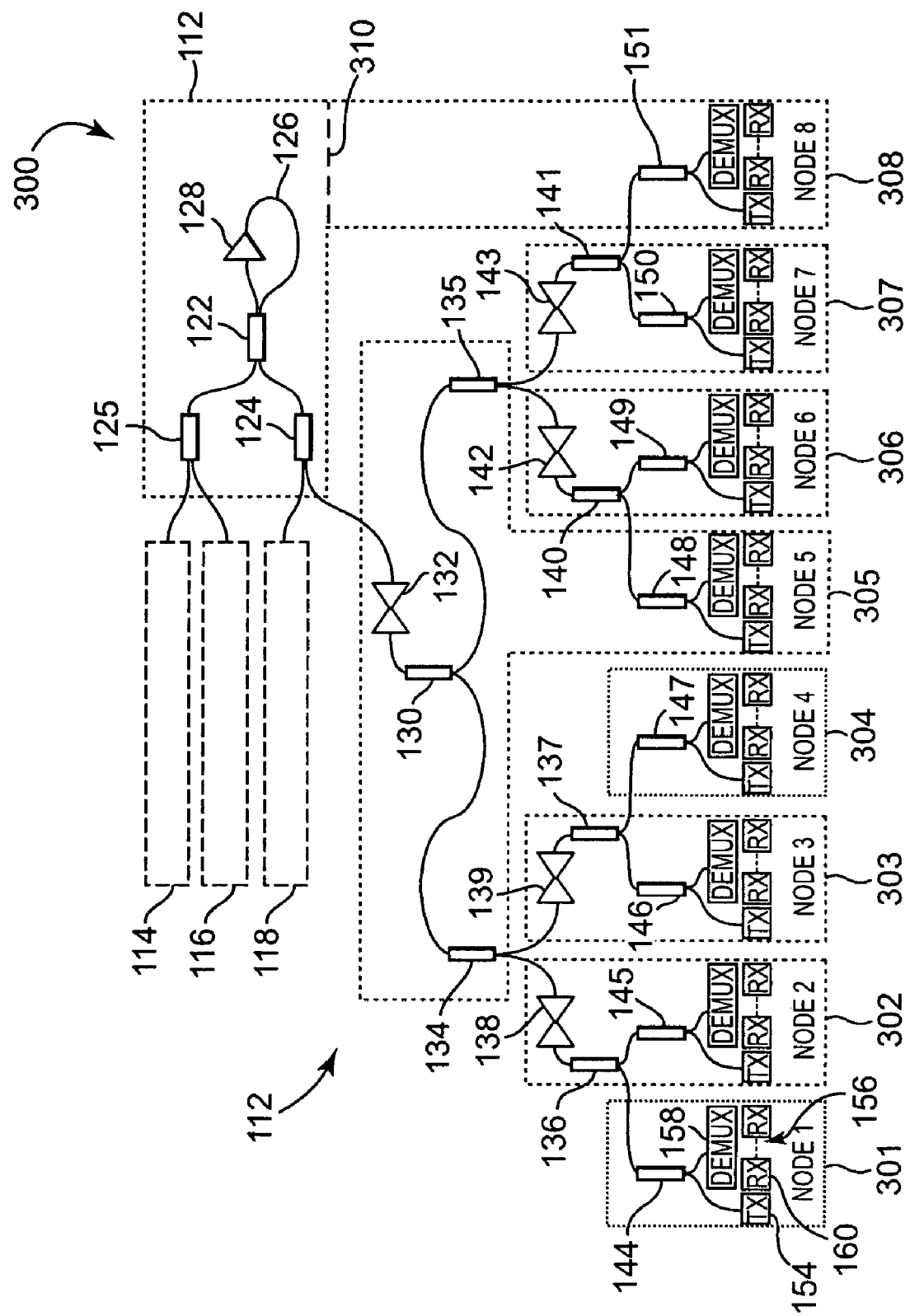
FIG. 7 is a schematic diagram of the optical transport system of FIG. 4 and constructed from interconnected network interface units shown in FIG. 6.

FIG. 7 is a schematic diagram of an optical transport system 300 of similar to the system 110 shown in FIG. 4. The system 300 is constructed from interconnected network interface units 250 shown in FIG. 6. The system 300 is based on the system 110, and like elements are labeled with like reference numerals, and includes reference to the components of NIU device 250. The system 300 has been separated into a center portion 120 connected to four sections 112, 114, 116, 118 where each section contains eight nodes 301, 302, 303, 304, 305, 306, 307, 308. Only section 112 is shown in detail, and the remaining sections 114, 116, 118 follow the same design as section 112. The nodes 301-308 are comprised of NIU devices 250, and the entire system 300 includes thirty-two NIU devices 250 interconnected with optical transmission paths, for example optical fiber. In the example shown, the NIU devices 250 contain all of the optical circuit elements to support the complete network 300.

Node 8, 308, of section 112 contains the elements for the center device and provides and receives optical signal directly to all four sections 112, 114, 116, 118. The signals at the lower level ports of devices 124, 125 would correspond with the signals at terminals 252, 254, 256, 258 in NIU device 250. Each of these lower level ports is coupled to node 5, 305, of a unique section 112, 114, 116, or 118. The optical transmission path 126 coupled to the higher level ports of device 122 corresponds with an optical transmission path coupled form terminal 260 to terminal 262 in NIU device 250. The higher level port of device 151 in node 8, 308, is coupled to a lower level port of device 141 in node 7, 307. This corresponds with terminal 268 in NIU device 250 of node 8 coupled to terminal 266 in NIU device 250 of node 7.

Node 5, 305, includes a connection to node 8 and also distributes and receives signals from node 2, 302, node 3, 303, node 6, 306, and node 7, 307. The lower level port of device 124 of node 8 is coupled to the higher level port of device 130 of node 5. This corresponds with terminal 252 of the NIU device of node 8 coupled to terminal 260 of the NIU device of node 5. One of the lower level ports of device 134 of node 5 is coupled to the higher level port of device 136 of node 2. This corresponds with terminal 254 of the NIU device of node 5 coupled to terminal 264 of the NIU device of node 2. The other of the lower level ports of device 134 of node 5 is coupled to the higher level port of device 137 of node 3. This corresponds with terminal 252 of the NIU device of node 5 coupled to terminal 264 of the NIU device of node 3.

One of the lower level ports of device 135 of node 5 is coupled to the higher level port of device 140 of node 6. This corresponds with terminal 258 of the NIU device of node 5 coupled to terminal 264 of the NIU device of node 6. The other of the lower level ports of device 135 of node 5 is coupled to the higher level port of device 141 of node 7. This corresponds with terminal 256 of the NIU device of node 5 coupled to terminal 264 of the NIU device of node 7. In addition, the higher level port of device 148 of node 5 is coupled to a lower level port of device 140 of node 6. This corresponds with terminal 268 of the NIU device of node 5 coupled to terminal 266 of the NIU device of node 6.

Nodes 2 and 3 are coupled to nodes 1 and 4, respectively. One of the lower level ports of device 136 of node 2 is coupled to the higher level port of device 144 of node 1. This corresponds with terminal 266 of the NIU device of node 2 coupled to terminal 268 of the NIU device of node 1. One of the lower level ports of device 137 of node 3 is coupled to the higher level port of device 147 of node 4. This corresponds with terminal 266 of the NIU device of node 3 coupled to terminal 268 of the NIU device of node 4.

The remaining sections 114, 116, 118 are connected in the same manner as nodes 1-8 of section 112 with the exception of node 8. The system 300 of the example includes only one center device. Therefore, terminals 252, 254, 256, 258, 260, 262 of the NIU device of node 8 in sections 114, 116, 118 are not connected to another NIU device. Rather node 8 of sections 114, 116, 118 in the example employ only the elements and connections shown below line 310 of node 8 in FIG. 7.

The system 300 includes several advantages, and a few of these advantages are listed here. The elements of network are contained in 32 separate integrated NIU devices. The absence of mechanical connections between the elements of the NIU device provides for a highly reliable network. If an NIU device should fail, however, the system can be quickly repaired with a simple interchange of an NIU device. Another particular advantageous feature of the system 300 is its relatively low power consumption in that at most one optical amplifier in each NIU device is activated. The system also includes a relatively low amount of optical elements through which a signal must pass in order to reach its destination as compared to other network topologies such as a ring.

Figure 8:
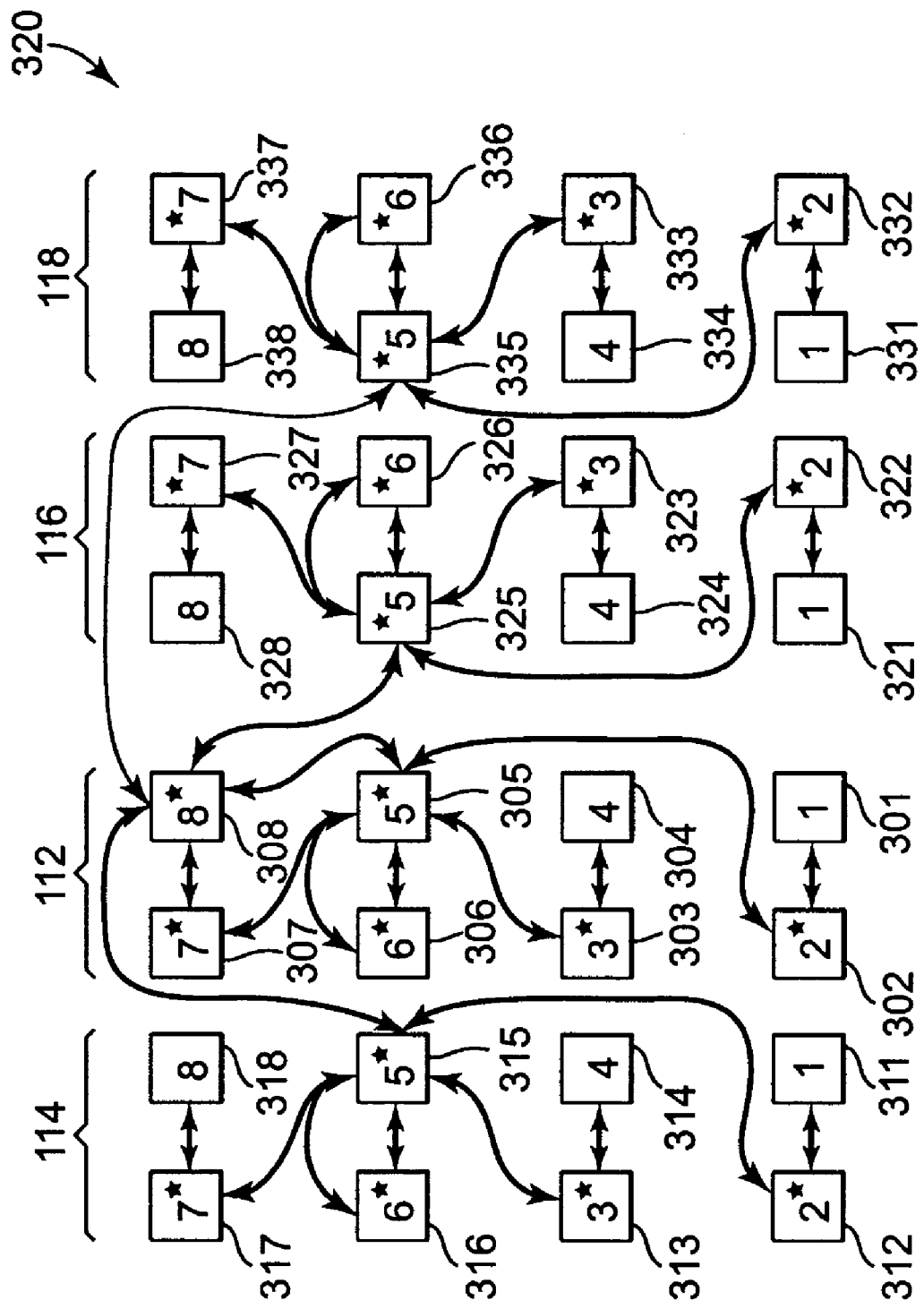
FIG. 8 is a schematic diagram of a system of thirty-two nodes connected together that can operate similarly to the system described in FIG. 7.

FIG. 8 is schematic diagram showing a system 320 of thirty-two NIU devices that can be connected together as shown in and described with reference to FIG. 7. Sections 112, 114, 116, 118 are arranged in four columns in the figure. Each section includes eight nodes, i.e., nodes 1-8 (301-308, respectively) in section 112, nodes 1-8 (311-318, respectively) in section 114, nodes 1-8 (321-328, respectively) in section 116, and nodes 1-8 (331-338, respectively) in section 118. The description proceeds with reference to NIU device 250 but can be constructed from other NIU devices as well. The system 320 shown can correspond with system 300 of FIG. 7.

The center device of the system 320 is included in node 8, 308, of section 112. Node 8 of section 112 is connected to node 5 of section 112, 114, 116, 118. If the NIU device 250 is used in the system 320, terminals 252, 254, 256, 258 of node 8 of section 112 is connected to terminal 260 of node 5 in sections 112, 114, 116, 118, (305, 315, 325, 335) respectively. Node 5 (305, 315, 325, 335) of each section is coupled to nodes 2, 3, 6, 7 within the same respective section. Again, terminals 252, 254, 256, 258 of the NIU device of node 5 of each section are coupled to terminal 264 of the NIU devices of nodes 3, 2, 7, 6, respectively, within the same section.

Nodes 2, 3, 6 and 7 of each section are further coupled to nodes 1, 4, 5 and 8, respectively within the same section. With NIU device 250 used in the system 320, terminals 266 in nodes 2, 3, 6, and 7 are coupled to terminals 268 in nodes 1, 4, 5, and 8, respectively.

At most only one operational amplifier in each node is activated when the NIU device 250 is used to construct the system 320. One amplifier in each of nodes 2, 3, 5, 6 and 7 are activated in sections 114, 116, 118. In section 112, one amplifier in each of nodes 2, 3, 5, 6 and 7 are also activated, and so is the amplifier in node 8 of section 112.

Figure 9A:
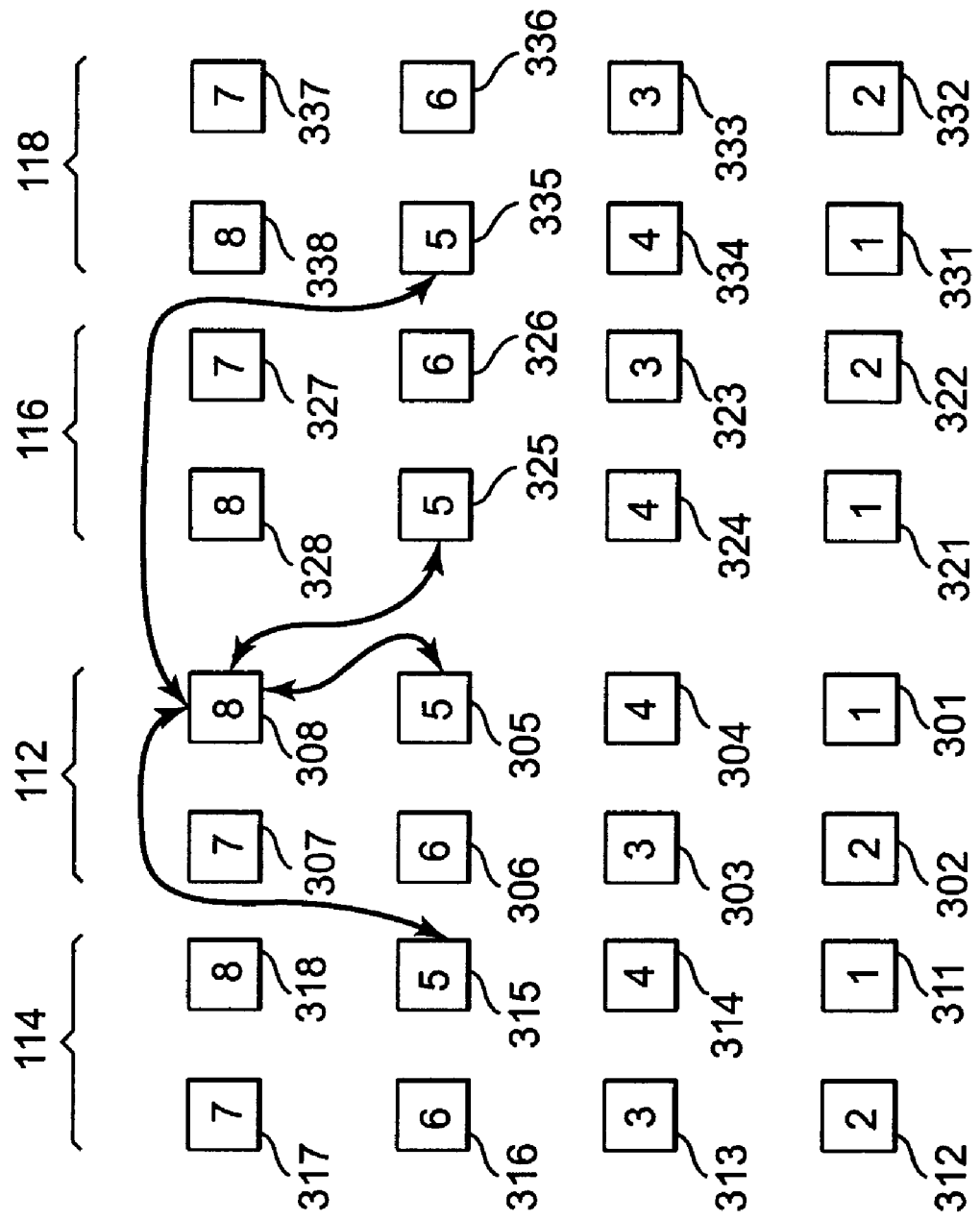
FIGS. 9A, 9B and 9C show schematic diagrams of the system of FIG. 8 in various stages of an implementation of the system architecture.
Figure 9B:
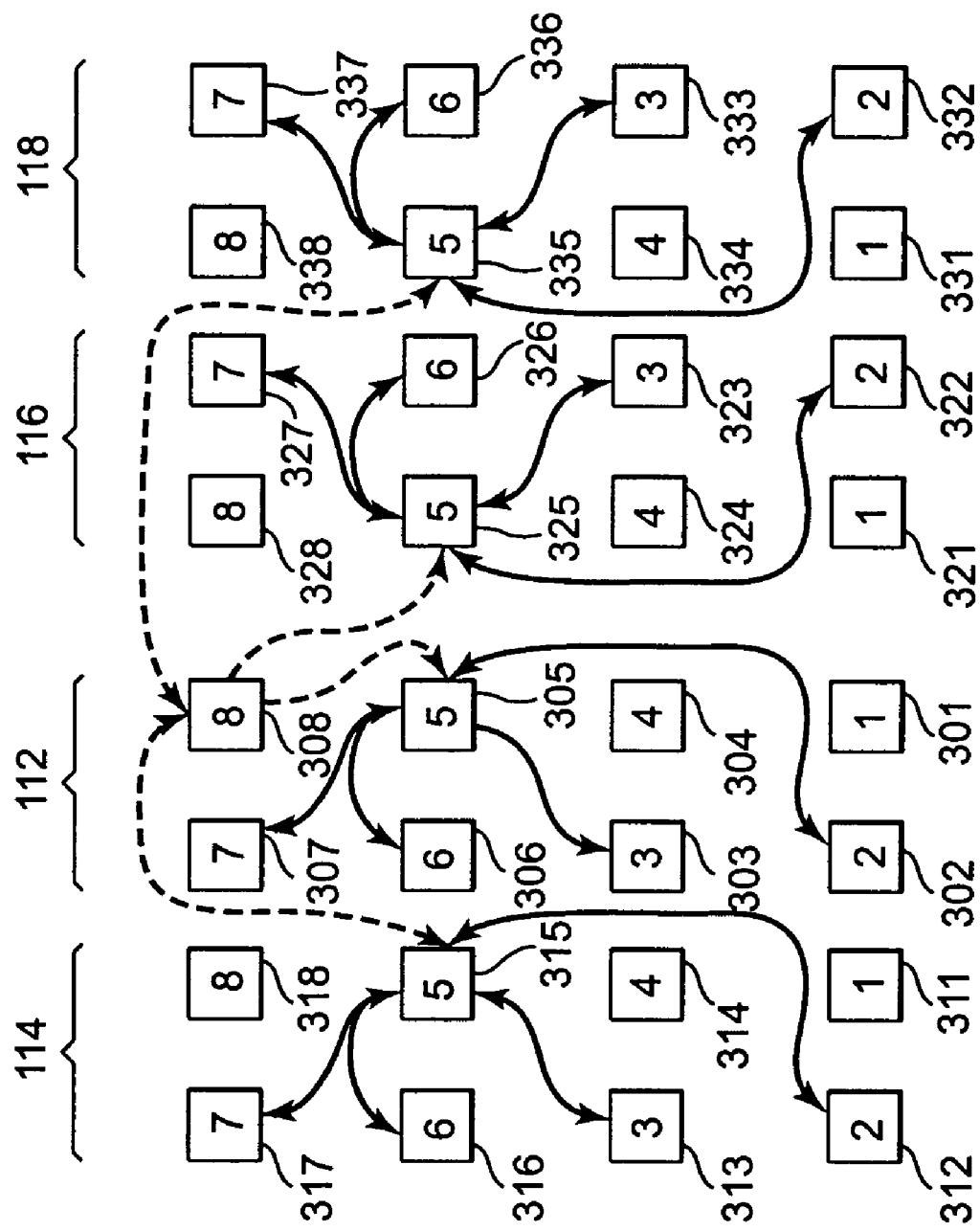
Figure 9C:
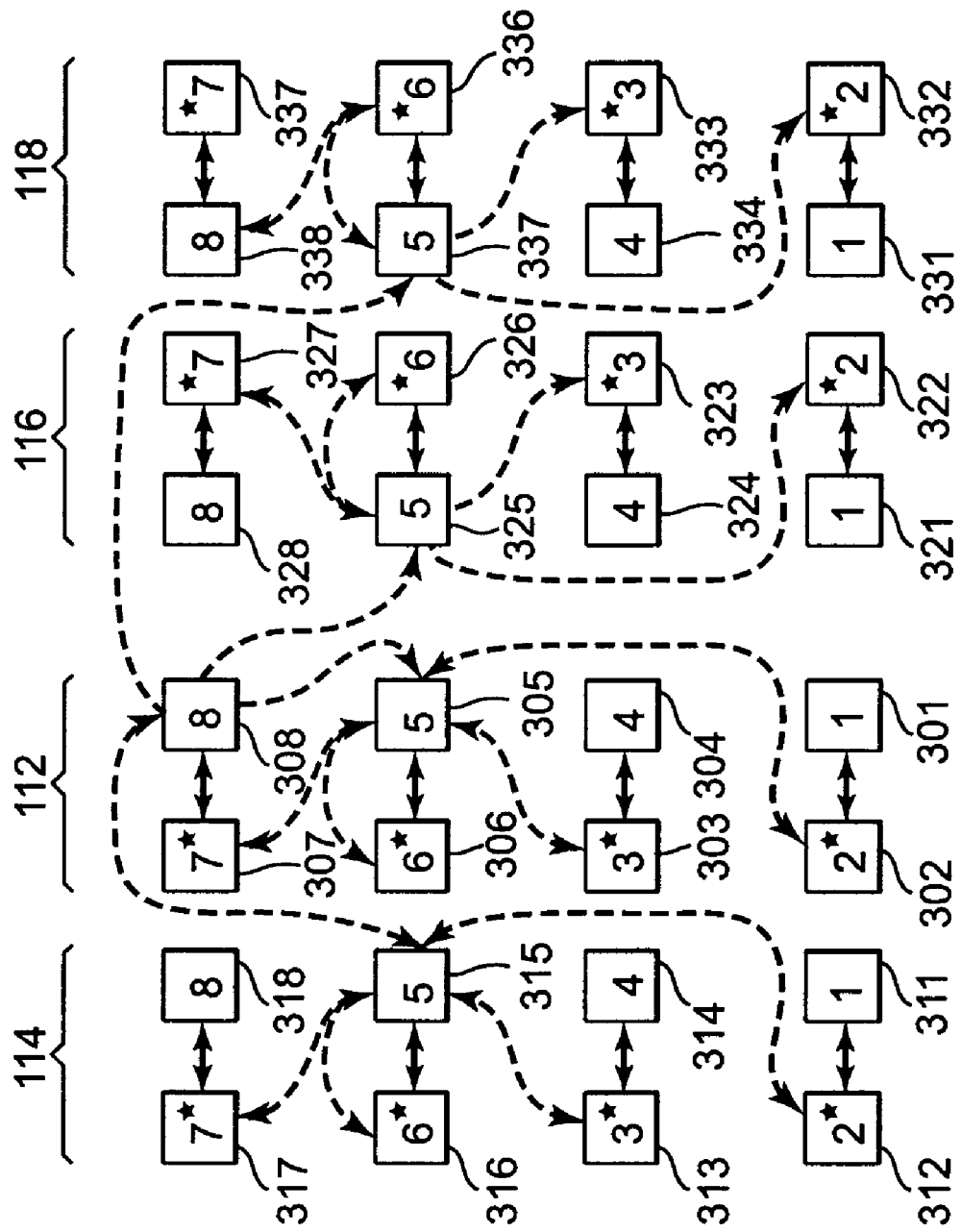

FIGS. 9A, 9B and 9C show schematic diagrams of the system 320 in various stages of an example implementation of a system architecture. The highest level of bidirectional connections in the architecture are between node 8 (308) of section 112 and with each node 5 (305, 315, 325, 335), as indicated in FIG. 9A. Node 8 (308) of section 112 contains the center device in this example, and the signals from each of the four node 5s are routed up node 8 of section 112 and then back into all of the four node 5s.

The next highest level of bidirectional connections is shown in FIG. 9B and illustrated with the solid lines where the connections shown in FIG. 9A are in phantom. Each of the node 5s (305, 315, 325, 335) from a given section 112, 114, 116 or 118 are connected with nodes 2, 3, 6 and 7 from the respective section. Each of the signals provided from the nodes 2, 3, 6, 7 from a given section to the node 5 of the same section are passed up to node 8 of section 112. Node 8 of section 112 then passes all of these signals down to all of the node 5s, which in turn provide all of these signals to the connected nodes 2, 3, 6 and 7.

The lowest level of bidirectional connections in this example is shown in FIG. 9C and illustrated with solid lines where the connections shown in FIGS. 9A-9B are shown in phantom. In each section, node 1 is connected with node 2; node 3 is connected with node 4; node 5 includes an additional connection with node 6 (in this example); and node 7 is connected with node 8. In this example, nodes 1, 4, 5, and 8 in each section can include a transmitter and a receiver. Signals generated with and received by the optoelectronic devices in these nodes are passed on to and received from nodes 2, 3, 6 and 7, respectively, as shown in the lowest level connections. Each of nodes 2, 3, 6, and 7 also can include a transmitter and a receiver. Accordingly, nodes 2, 3, 6, and 7 generate and receive signals and pass through signals generated and received from nodes 1, 4, 5 and 8, respectively.

Figure 10:
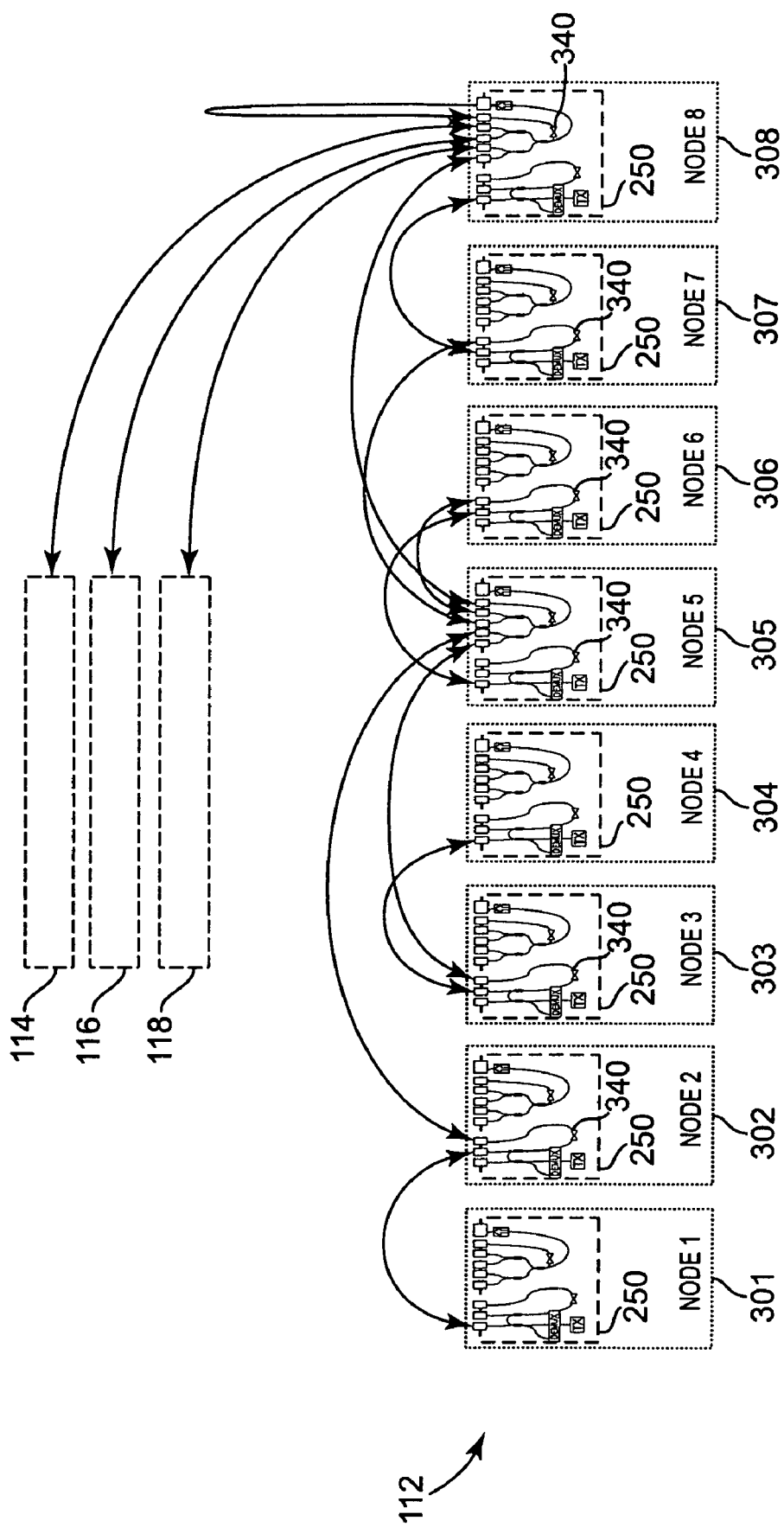
FIG. 10 is a more detailed schematic diagram of the system of FIG. 8 as constructed from a plurality of Network Interface Units devices shown in FIG. 6.

FIG. 10 is a more detailed schematic diagram of the system 320 constructed of NIU devices 250 showing the connections between the terminals of the NIU devices in section 112. The connections in the remaining sections 114, 116, 118 are generally indicated and can be understood once examining FIGS. 7-9 and their respective descriptions. The optical transmission paths in FIG. 10 include optical fiber mechanically connected to and in optical communication with the NIU devices of each node. In addition, the active operational amplifiers are indicated at reference numeral 340.

Node 8, 308, of section 112 contains the elements for the center device and provides and receives optical signal directly to all four sections 112, 114, 116, 118. Terminal 260 of the NIU device of node 8 is coupled to terminal 262 of the same NIU device. Terminal 268 of the NIU device of node 8 is coupled to terminal 266 in the NIU device of node 7.

Node 5, 305, includes a connection to node 8 and also distributes and receives signals from node 2, 302, node 3, 303, node 6, 306, and node 7, 307. Terminal 252 of the NIU device of node 8 is coupled to terminal 260 of the NIU device of node 5. Terminal 254 of the NIU device of node 5 is coupled to terminal 264 of the NIU device of node 2. Terminal 252 of the NIU device of node 5 is coupled to terminal 264 of the NIU device of node 3. Terminal 258 of the NIU device of node 5 is coupled to terminal 264 of the NIU device of node 6. Terminal 256 of the NIU device of node 5 is coupled to terminal 264 of the NIU device of node 7. In addition, terminal 268 of the NIU device of node 5 is coupled to terminal 266 of the NIU device of node 6.

Nodes 2 and 3 are coupled to nodes 1 and 4, respectively. Terminal 266 of the NIU device of node 2 is coupled to terminal 268 of the NIU device of node 1. Terminal 266 of the NIU device of node 3 is coupled to terminal 268 of the NIU device of node 4.

Figure 11:
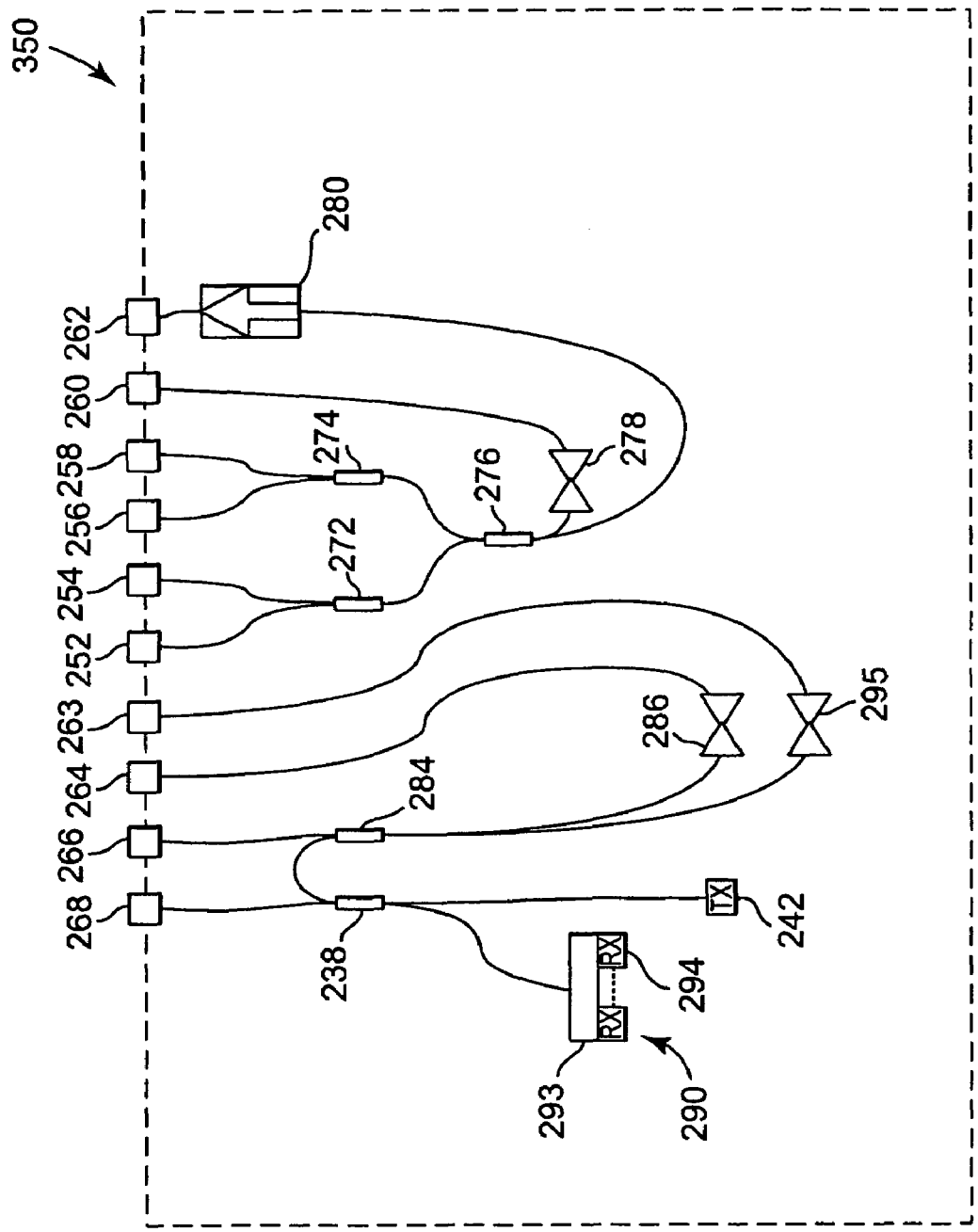
FIG. 11 is a schematic diagram of another example of a network interface unit that is adapted to construct optical transport systems of the present disclosure.

FIG. 11 is a schematic diagram of another NIU device 350. The NIU device 350 is similar to the NIU device 250, and like parts are labeled with like reference numbers. In addition, the NIU device 350 includes a secondary optical transmission path coupled between the higher level port of device 284 and new terminal 263. The secondary optical transmission path includes a bidirectional optical amplifier 295. The optical transmission path from device 284 through amplifier 286 to terminal 264 can be referred to as a primary path.

The NIU device 350 is an example of an NIU device that contains components that provide redundancy in the network and guard against system failure. The redundancy aspect in the example is adapted to provide a safeguard to the system itself. For instance, the redundancy aspect is directed to the generally higher levels of coupler/splitter devices in the systems and to some of the operational amplifiers of the system. Failure of these items can lead to failure in the functionality of the entire network. The redundancy aspect of the NIU device 350 is not as much directed to the generally lower level coupler/splitter devices, the transmitter, or the receiver array because failure of these items generally affects one or two nodes in the system, and not the entire system or a large portion of the entire system. The example NIU device 350 includes components that provide redundancy based on simplicity of the device, ease of manufacture and installation, and cost. Of course, examples of other NIU devices that provide redundancy can be constructed to include redundant components for either less or more of the system. These examples are contemplated here and are now understood by those skilled in the art.

Figure 12:
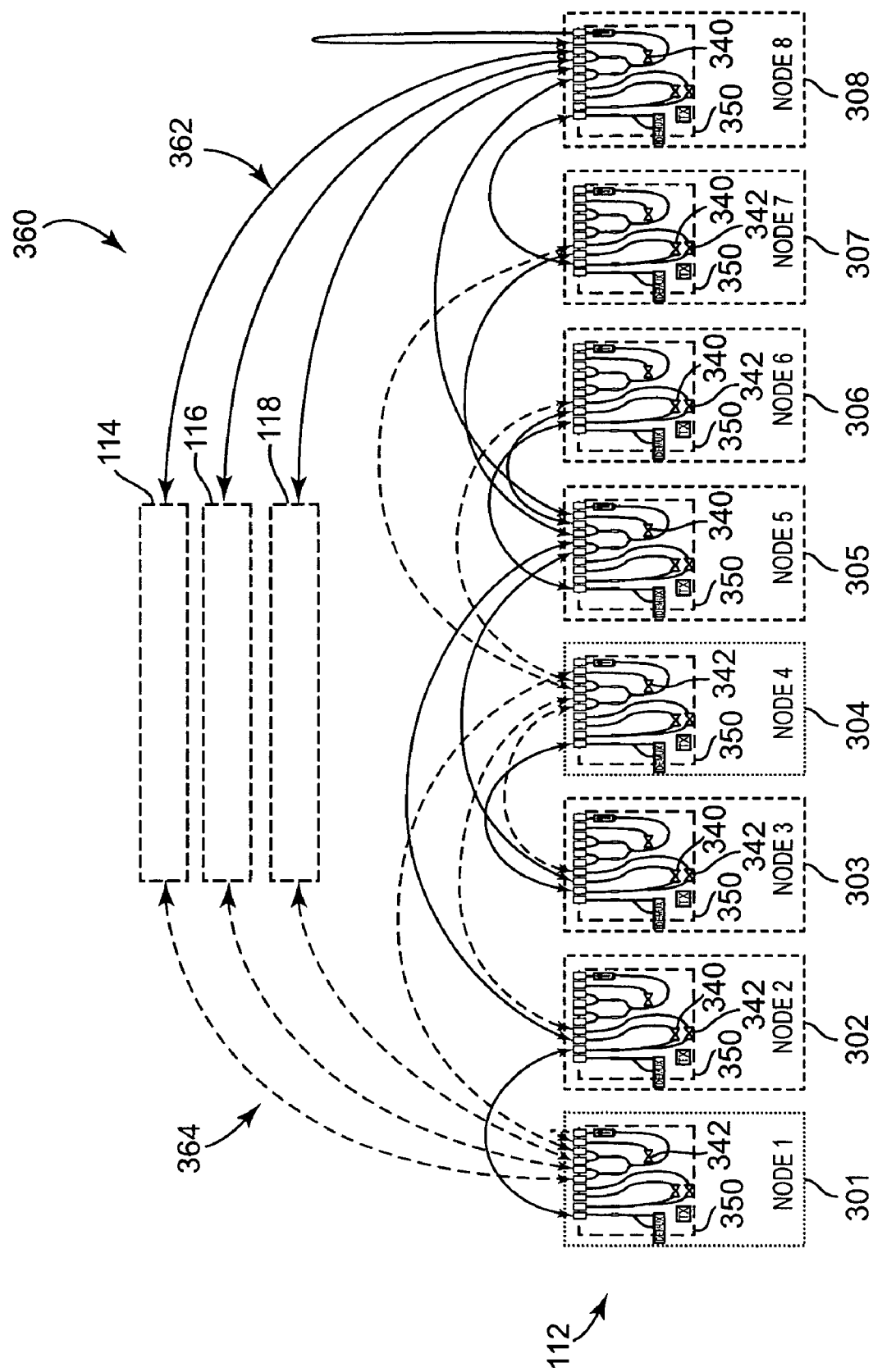
FIG. 12 is a schematic diagram of a system including a primary transport system and a secondary transport system that is adapted to be operation when the primary transport system is inactive.

FIG. 12 is a schematic diagram of a system 360 including both a primary transport system 362 and a secondary, or redundant, transport system 364 that is adapted to be operative when the primary transport system 362 is inactive. The system 360 in the example is constructed from NIU devices 350 shown and described in FIG. 11. FIG. 12 shows the connections between the terminals of the NIU devices 350 in section 112. The connections in the remaining sections 114, 116, 118 are generally indicated and can be understood once examining the connections of section 112. The optical transmission paths in FIG. 12 include optical fiber mechanically connected to and in optical communication with the NIU devices of each node.

The inter-device or inter-node connections in the primary transport system 362 are shown in solid lines. The primary transport system 362 using NIU devices 350 includes similar connections as in the system 320 above. In FIG. 12, node 8, 308, of section 112 contains the elements for the center device of the primary transport system and provides and receives optical signal directly to and from all four sections 112, 114, 116, 118. Terminal 260 of the NIU device of node 8 is coupled to terminal 262 of the same NIU device. Terminal 268 of the NIU device of node 8 is coupled to terminal 266 in the NIU device of node 7. Node 5, 305, includes a connection to node 8 and also distributes and receives signals from node 2, 302, node 3, 303, node 6, 306, and node 7, 307. Terminal 252 of the NIU device of node 8 is coupled to terminal 260 of the NIU device of node 5. Terminal 254 of the NIU device of node 5 is coupled to terminal 264 of the NIU device of node 2. Terminal 252 of the NIU device of node 5 is coupled to terminal 264 of the NIU device of node 3. Terminal 258 of the NIU device of node 5 is coupled to terminal 264 of the NIU device of node 6. Terminal 256 of the NIU device of node 5 is coupled to terminal 264 of the NIU device of node 7. In addition, terminal 268 of the NIU device of node 5 is coupled to terminal 266 of the NIU device of node 6. Nodes 2 and 3 are coupled to nodes 1 and 4, respectively. Terminal 266 of the NIU device of node 2 is coupled to terminal 268 of the NIU device of node 1. Terminal 266 of the NIU device of node 3 is coupled to terminal 268 of the NIU device of node 4.

The inter-device or inter-node connections in the secondary transport system 362 are shown in broken lines. Node 1, 301, of section 112 contains the elements for the center device in the secondary transport system 364 and provides and receives optical signal directly to and from all four sections 112, 114, 116, 118. Terminal 260 of the NIU device of node 1 is coupled to terminal 262 of the same NIU device. Node 4, 304, includes a connection to node 1 and also distributes and receives signals from node 2, 302, node 3, 303, node 6, 306, and node 7, 307, in the secondary transport system. In the example, terminal 258 of the NIU device of node 1 is coupled to terminal 260 of the NIU device of node 4. Terminal 254 of the NIU device of node 4 is coupled to terminal 263 of the NIU device of node 2. Terminal 252 of the NIU device of node 4 is coupled to terminal 263 of the NIU device of node 3. Terminal 258 of the NIU device of node 4 is coupled to terminal 263 of the NIU device of node 7. Terminal 256 of the NIU device of node 4 is coupled to terminal 263 of the NIU device of node 6.

The active operational amplifiers are indicated at reference numeral 340. The optical amplifiers that are active in the secondary transport system are indicated at reference numeral 342. As with the primary transport system, at most one amplifier is active per node during operation of the secondary system.

Several of the connections used in the primary system 362 are also used in the secondary system 364. These includes terminal 268 of node 1 to terminal 266 of node 2, terminal 266 of node 3 to terminal 268 of node 4, terminal 268 of node 5 to terminal 266 of node 6, and terminal 266 of node 7 to terminal 268 of node 8. These items do not include a redundant or backup system. Failure of these connections or components generally affects only one or two nodes in the system, and not the entire system or a large portion of the entire system as served by the secondary transport system 362. Of course, examples are contemplated that include redundancy of these connections and components, as well as less redundancy than that shown and described in FIG. 12.

FIGS. 13A, 13B, 13C, and 13D are schematic diagrams of an example architecture of system 360 in various stages of implementation. The description of the architecture proceeds with an example system of thirty-two NIU devices that can be connected together as shown in and described with reference to FIG. 12. Sections 112, 114, 116, 118 are arranged in four columns in the figure. Each section includes eight nodes, i.e., nodes 1-8 (301-308, respectively) in section 112, nodes 1-8 (311-318, respectively) in section 114, nodes 1-8 (321-328, respectively) in section 116, and nodes 1-8 (331-338, respectively) in section 118. The description proceeds with reference to NIU device 350 but can be constructed from other NIU devices as well.

Figure 13A:
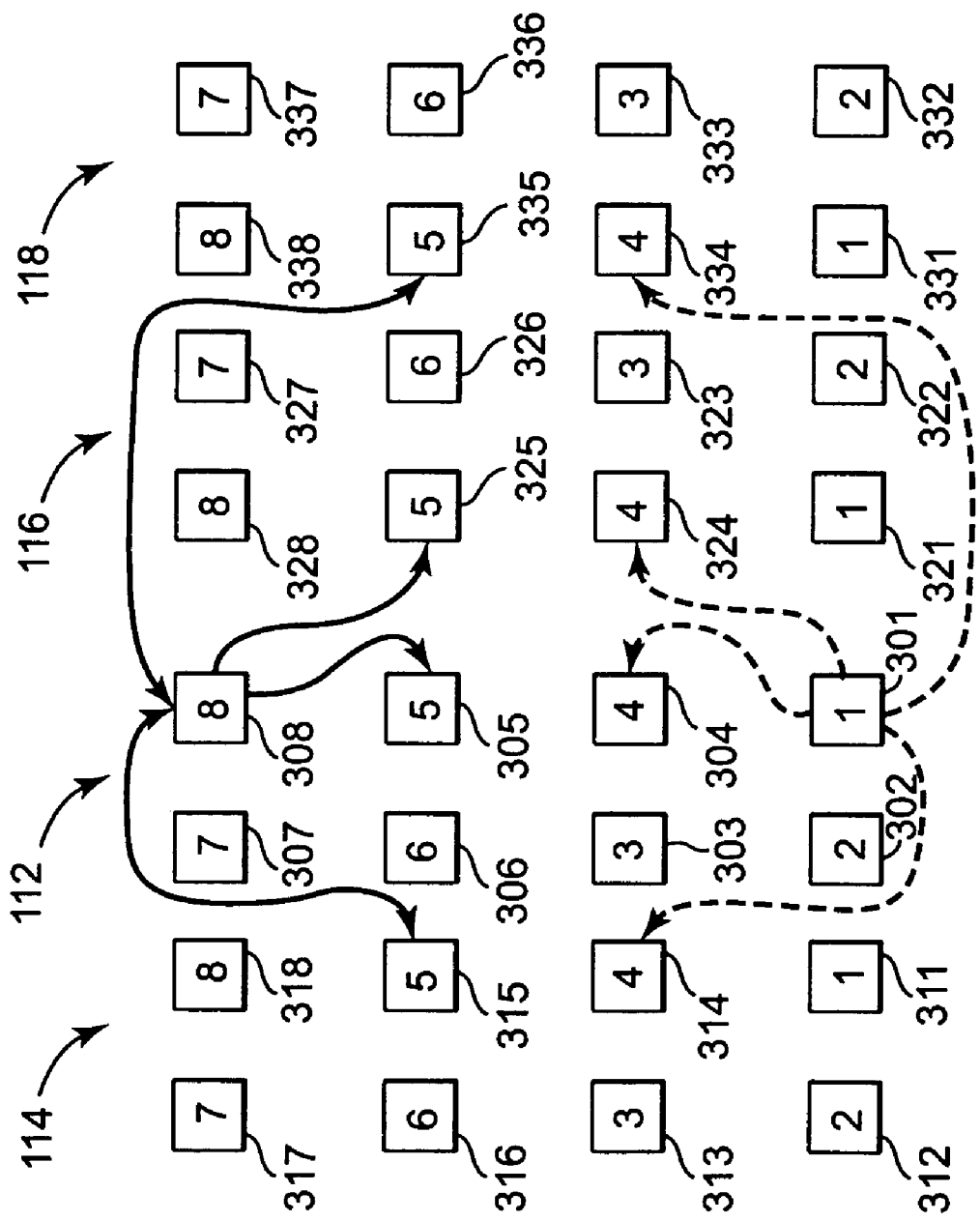
FIGS. 13A, 13B, 13C, and 13D are schematic diagrams of another example system architecture in various stages of implementation.

FIG. 13A shows the highest level of bidirectional connections of the primary system 362 in the architecture as between node 8 (308) of section 112 and with each node 5 (305, 315, 325, 335), as indicated with the solid lines. Node 8 (308) of section 112 contains the center device in the primary system, and the signals from each of the four node 5s are routed up to node 8 of section 112 and then back into all of the four node 5s.

FIG. 13A also shows the highest level of bidirectional connections of the secondary system 364 in the architecture as between node 1 (301) of section 112 and with each node 4 (304, 314, 324, 334), as indicated with the broken lines. Node 1 (301) of section 112 contains the center device in the secondary system 364, and the signals from each of the four node 4s are routed up to node 1 of section 112 and then back into all of the four node 4s when the secondary system is operational.

Figure 13B:
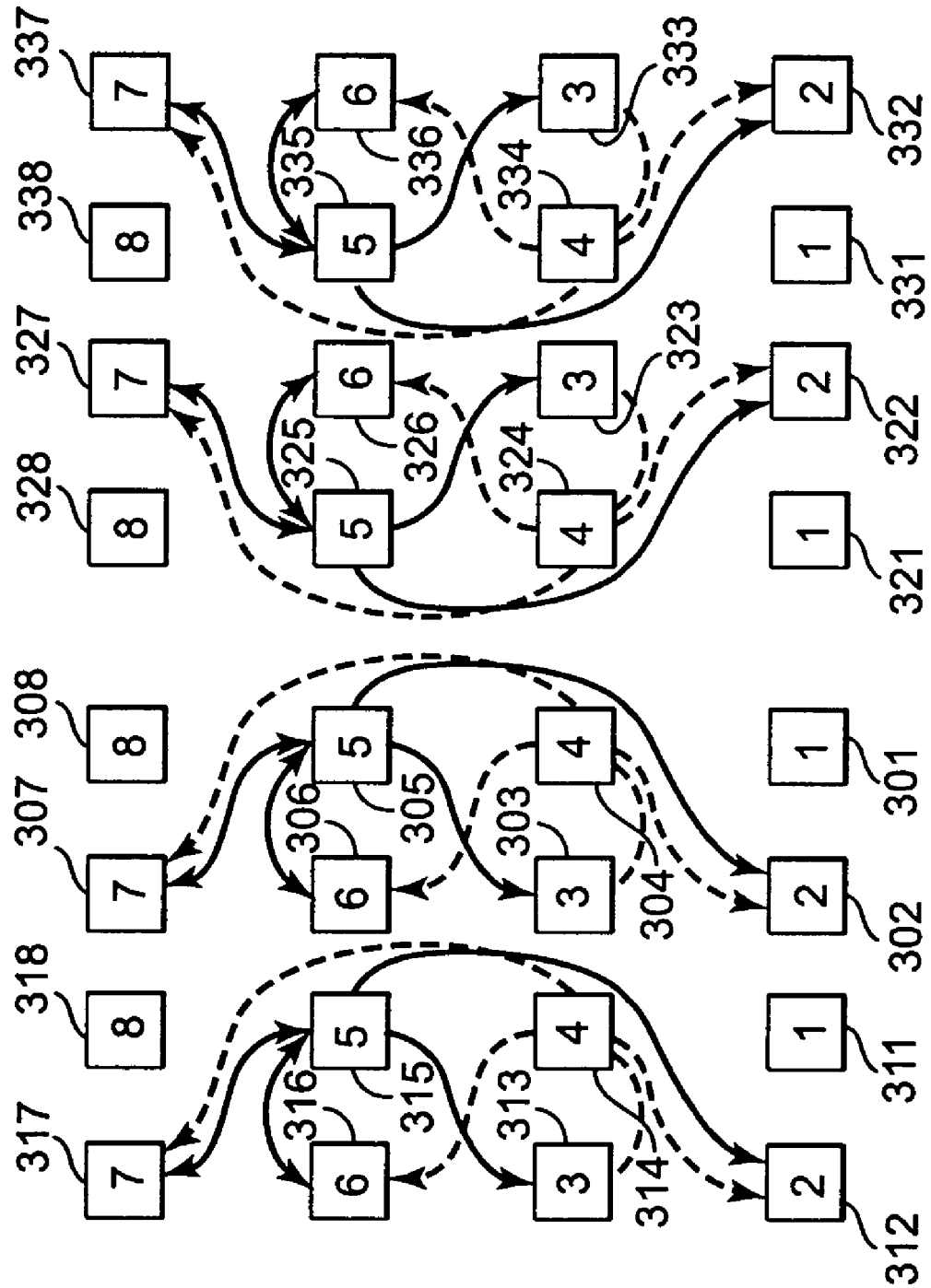

FIG. 13B shows the next highest level of bidirectional connections in the primary system 362, which are indicated with solid lines. Each of the node 5s (305, 315, 325, 335) from a given section 112, 114, 116 or 118 are connected with nodes 2, 3, 6 and 7 from the respective section. Each of the signals provided from the nodes 2, 3, 6 and 7 from a given section to the node 5 of the same section are passed up to node 8 of section 112. Node 8 of section 112 then passes all of these signals down to all of the node 5s, which in turn provide all of these signals to the connected nodes 2, 3, 6 and 7.

FIG. 13B also shows the next highest level of bidirectional connections in the secondary system 364, which are indicated with broken lines. Each of the node 4s (304, 314, 324, 334) from a given section 112, 114, 116 or 118 are connected with nodes 2, 3, 6 and 7 from the respective section. Each of the signals provided from the nodes 2, 3, 6 and 7 from a given section to the node 4 of the same section are passed up to node 1 of section 112. Node 1 of section 112 then passes all of these signals down to all of the node 4s, which in turn provide all of these signals to the connected nodes 2, 3, 6 and 7 when the secondary system is operational.

Figure 13C:
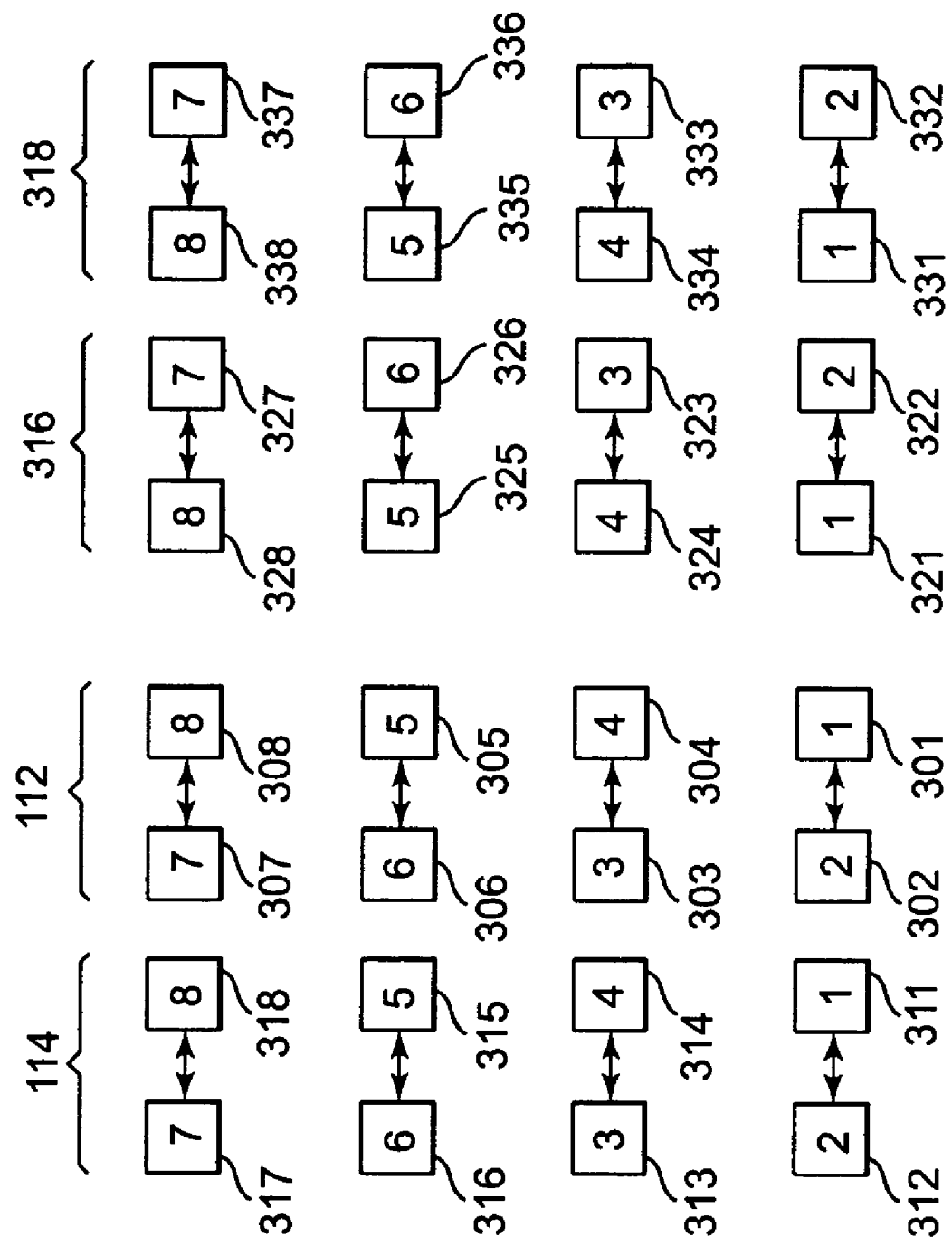

FIG. 13C shows the device level connections, or the connections that are common to both the primary transport system and secondary transport system. In each section, node 1 is connected with node 2; node 3 is connected with node 4; node 5 is connected with node 6; and node 7 is connected with node 8.

Figure 13D:
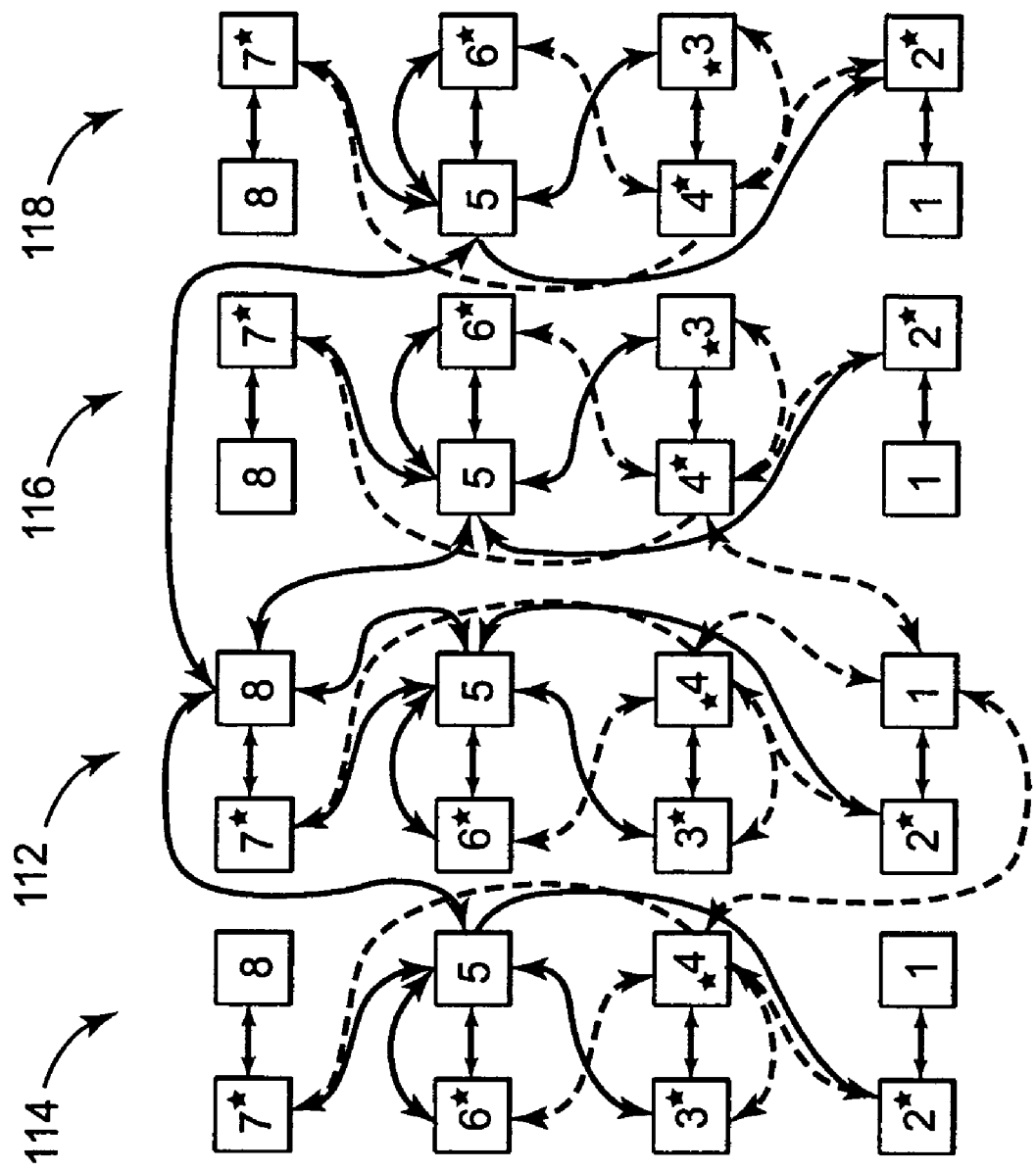

FIG. 13D shows the system 360 architecture with all of the connections from FIGS. 13A-13C. The primary system 362 and device level connections are shown with solid lines, and the secondary system 364 connections are shown with broken lines. FIG. 13D also shows the operational amplifiers that are active depending on which system 362 or 364 is active. Nodes 2, 3, 6 and 7 of each section include an active optical amplifier regardless of which system is operational. The active amplifiers in these nodes are indicated with a star. All node 5s and node 8 of section 112 include an active optical amplifier when the primary system 362 is operational. The amplifiers in these nodes are not active when the secondary system 364 is operational. Instead, all node 4s and node 1 of section 112 include an active optical amplifier when the secondary system 364 is operational. The amplifiers in these nodes are not active when the primary system 362 is operational. One amplifier is active in each node for the system to be operational for this example.

The present invention has now been described with reference to several embodiments. The foregoing detailed description and examples have been given for clarity of understanding only. Those skilled in the art will recognize that many changes can be made in the described embodiments without departing from the scope and spirit of the invention. Thus, the scope of the present invention should not be limited to the exact details and structures described herein, but rather by the appended claims and equivalents.

What is claimed is:

1. An optical transport system architecture, comprising:
   a plurality of node sections, each node section including a plurality of network interface unit devices wherein each network interface unit device corresponds with a node and each network interface unit is substantially the same comprising an optical receiver, an optical transmitter, and a plurality of coupler/splitter devices each having at least one lower level port and a higher level port;
   wherein one of the nodes is designated as a primary central node having a higher level port of a coupler/splitter device of the corresponding network interface unit coupled back upon itself thus causing a signal received at a lower level port of the coupler/splitter device of the corresponding network interface unit to be transmitted back to each of the lower level ports of the coupler/splitter device of the corresponding network interface unit;
   wherein each node section includes one node designated as a primary grouper node, and a plurality of nodes designated as additional grouper nodes;
   a plurality of first bidirectional optical transmission paths coupled to the lower level ports of coupler/splitter devices of the corresponding network interface unit of the primary central node and also coupled to separate ones of the upper level ports of the coupler/splitter devices of the network interface units of the primary grouper nodes such that each photonic signal supplied to the lower level ports of the coupler/splitter devices corresponding to the primary grouper nodes is provided to the primary central node and is then provided back to all of the lower level ports of the coupler/splitter devices of the primary grouper nodes; and
   a plurality of second bidirectional optical transmission paths coupled to each of the lower level ports of coupler/splitter devices of the primary grouper nodes and also coupled to a separate ones of the upper level ports of coupler/splitter devices corresponding to the additional grouper nodes, such that photonic signals from the additional grouper nodes are provided to the primary grouper nodes and are then provided to all of the lower level ports of the coupler/splitter devices corresponding to the additional grouper nodes.

2. The optical transport system architecture of claim 1 wherein each node contains no more than one active optical amplifier.

3. The optical transport system architecture of claim 1 wherein the plurality of network interface units is thirty-two network interface units.

4. The optical system architecture of claim 3 wherein the plurality of node sections is four node sections.

5. The optical system architecture of claim 4 wherein each node section includes eight nodes.

6. An optical transport system architecture with redundancy, comprising:
   a plurality of node sections, each node section including a plurality of network interface unit devices wherein each network interface unit device corresponds with a node;
   a primary optical transport system configured from the nodes:
   wherein one of the nodes is a primary central node,
   wherein each node section includes one primary grouper node, and
   wherein each node section includes a plurality of primary additional nodes;
   a secondary optical transport system configured from the nodes and adapted to operate when the primary transport system is inactive, the secondary optical transport system including:
   a secondary central node wherein one of the primary additional nodes is also the secondary central node,
   a plurality of secondary grouper nodes wherein each node section includes one secondary grouper node wherein one of the primary additional nodes that is not the secondary central node is also the secondary grouper node, and a plurality of secondary additional nodes in each node section, wherein the primary additional nodes in the primary optical transport system that are not also the secondary central node and the secondary grouper nodes are secondary additional nodes;

a plurality of first bidirectional optical transmission paths coupled to the primary central node, wherein each of the plurality of first bidirectional optical transmission paths is also coupled to a separate one of the primary grouper nodes such that each of photonic signals from the primary grouper devices are provided to the primary central node and then are provided to all of the primary grouper nodes;

a plurality of second bidirectional optical transmission paths coupled to each of the primary grouper nodes, wherein each of the plurality of second bidirectional optical transmission paths is also coupled to a separate one of the primary additional nodes in the node section of the corresponding optically coupled primary grouper node such that each of photonic signals from the primary additional nodes are provided to the primary grouper node and then are provided to all of the primary grouper nodes;

a plurality of third bidirectional optical transmission paths coupled to the secondary central node, wherein each of the plurality of third bidirectional optical transmission paths is also coupled to a separate one of the secondary grouper nodes such that each of photonic signals from the secondary grouper nodes are provided to the secondary central node and are then provided to all of the secondary grouper nodes;

a plurality of fourth bidirectional optical transmission paths coupled to each of the secondary grouper nodes, wherein each of the plurality of fourth bidirectional optical transmission paths is also coupled to a separate one of the secondary additional nodes in the node section of the corresponding optically coupled secondary grouper node such that each of photonic signals from the secondary additional nodes are provided to the secondary grouper node and then are provided to all of the primary grouper nodes.

7. The optical transport system architecture of claim 6 wherein the plurality of network interface units is thirty-two network interface units.

* * * * *